United States Patent
Antunes et al.

(10) Patent No.: US 9,460,719 B1
(45) Date of Patent: Oct. 4, 2016

(54) AUTOMATED DELIVERY OF TRANSCRIPTION PRODUCTS

(71) Applicant: 3Play Media, INC., Cambridge, MA (US)

(72) Inventors: Christopher S. Antunes, Somerville, MA (US); Roger S. Zimmerman, Wellesley, MA (US); Christopher E. Johnson, Belmont, MA (US); Anatole Khesin, Somerville, MA (US); Jeremy E. Barron, Boston, MA (US); Joshua Miller, Charlestown, MA (US); Harriet Ruth Owers-Bradley, Boston, MA (US)

(73) Assignee: 3Play Media, Inc., Boston, MA (US)

( * ) Notice: Subject to any disclaimer, the term of this patent is extended or adjusted under 35 U.S.C. 154(b) by 54 days.

(21) Appl. No.: 14/472,070

(22) Filed: Aug. 28, 2014

Related U.S. Application Data

(60) Provisional application No. 61/891,024, filed on Oct. 15, 2013.

(51) Int. Cl.
*G10L 15/00* (2013.01)
*G10L 15/26* (2006.01)

(52) U.S. Cl.
CPC .................................. *G10L 15/26* (2013.01)

(58) Field of Classification Search
None
See application file for complete search history.

(56) References Cited

U.S. PATENT DOCUMENTS

| | | | |
|---|---|---|---|
| 5,179,627 A | 1/1993 | Sweet et al. | |
| 6,980,953 B1 * | 12/2005 | Kanevsky | G06F 17/289 704/2 |
| 7,016,844 B2 * | 3/2006 | Othmer | G06Q 10/10 704/235 |
| 7,031,998 B2 * | 4/2006 | Archbold | G06F 9/4881 709/201 |
| 7,558,735 B1 | 7/2009 | Obilisetty | |
| 8,346,563 B1 * | 1/2013 | Hjelm | G10L 15/1822 379/88.01 |
| 2002/0077833 A1 | 6/2002 | Arons et al. | |
| 2002/0128842 A1 | 9/2002 | Hoi et al. | |
| 2008/0059173 A1 * | 3/2008 | Gilbert | G06F 17/30893 704/235 |
| 2010/0125450 A1 * | 5/2010 | Michaelangelo | G06F 17/2725 704/9 |
| 2011/0099006 A1 * | 4/2011 | Sundararaman | G10L 15/26 704/208 |
| 2014/0122069 A1 * | 5/2014 | Bravin | G10L 15/183 704/235 |
| 2015/0066505 A1 * | 3/2015 | Baker | G10L 25/87 704/235 |

* cited by examiner

*Primary Examiner* — Marcus T Riley
(74) *Attorney, Agent, or Firm* — Finch & Maloney PLLC

(57) ABSTRACT

A system for delivering transcription products is provided. The system includes a memory, a processor coupled to the memory, a customer interface component, an automatic speech recognition component, an editor interface component, and a delivery agent component. The customer interface component is configured to receive transcription request information identifying at least one media file, the at least one media file including content. The automatic speech recognition component is configured to generate draft transcription information that represents a draft transcription of the content. The editor interface component is configured to generate edited transcription information that represents an edited transcription of the content. The delivery agent component is configured to evaluate delivery criteria to determine whether to deliver a transcription product and transmit the transcription product in response to determining that the delivery criteria is satisfied.

20 Claims, 9 Drawing Sheets

AUTOMATED DELIVERY OF TRANSCRIPTION PRODUCTS

RELATED APPLICATIONS

The present application claims priority under 35 U.S.C. §119(e) to U.S. Provisional Application 61/891,024, titled "SYSTEMS AND METHODS FOR CONTINUOUSLY IMPROVING TRANSCRIPTIONS," filed on Oct. 15, 2013, which is hereby incorporated herein by reference in its entirety. The present application relates to U.S. application Ser. No. 13/246,123 filed on Sep. 27, 2011 and titled "ELECTRONIC TRANSCRIPTION JOB MARKET," ("Electronic Transcription Job Market' application") which is hereby incorporated herein by reference in its entirety. The present application relates to U.S. application Ser. No. 13/426,339 filed on Mar. 21, 2012 and titled "INTELLIGENT CAPTION SYSTEMS AND METHODS," ("Intelligent Captions' application") which is hereby incorporated herein by reference in its entirety. The present application relates to U.S. Application Ser. No. 61/888,358 filed on Oct. 8, 2013 and titled "AUTOMATED CAPTION POSITIONING," ("Automated caption positioning' provisional application") which is hereby incorporated herein by reference in its entirety.

BACKGROUND

1. Technical Field

The technical field relates generally to transcription of content and, more particularly, to systems and methods for automated delivery of transcription products.

2. Background Discussion

Media content (for example video and audio content) is becoming increasingly prevalent as a medium on the internet. Much of this content is time sensitive and transient. For example, news and popular culture videos often receive the vast majority of internet accesses in the first few days (if not hours) after they are posted online. Also, some educational materials, including video and audio recordings of lectures, are posted on the internet and intended to be consumed almost immediately by students.

For the hearing impaired, individuals with attention deficits, and non-native speakers of the language in which the video/audio content is recorded, this content presents significant challenges. Legislation and regulations often mandate that this content be made accessible to this population of consumers. Typically, content providers make available transcripts and captions of this content to assist this population, and to more generally (e.g. even with non-impaired users) increase engagement with the online media. Time-coded transcriptions of the content also make possible advanced capabilities such as the interactive transcript plugins and archive search plugins provided by 3Play Media of Cambridge, Mass. Additionally, associating transcripts, descriptive summaries, and internet search keywords with the media content can increase the chances that the content will be found by search engines such as the GOOGLE search engine.

However, given the time-sensitive and transient nature of this content, making transcripts, captions, and these related products available in time for them to be of use for this population is difficult and costly. Often, associating some form of transcription with the media within hours is desired. This can be accomplished using fully-automated means to produce a transcript, but it is well known that such automated transcripts are often too replete with errors to be of much use to the target population. This is particularly true when the automation is real-time automatic speech recognition (ASR), since the state of the art of real-time ASR is restricted by computational constraints (e.g. CPU and memory availability) in achieving accuracy. Moreover, once real-time ASR transcripts have been made publicly available for media, it is impractical to modify these using, for example, confidence thresholds on the ASR quality. In particular, since real-time ASR systems typically output words, phrases or sentences in synchronization with the receipt of the audio, these systems are not amenable to automated modification of the output at a later time. Further, when real-time ASR systems do provide a confidence metric, this metric is typically used to modify the visual appearance of the text (e.g. by coloring unconfident words or phrases differently than confident regions) and not to prevent display of the unconfident sections of the transcript.

SUMMARY

Embodiments disclosed herein address the problems described above, among other problems, by automatically delivering increasingly accurate versions of the transcription products (e.g., transcripts, captions, captions encoded in media files, or other products derived from transcripts, such as internet search keywords) for inclusion with online media. Initially, in at least one embodiment, transcription products may be provided automatically for the media, subject to a configurable quality threshold. Subsequently, in this embodiment, the transcription products are edited by a human transcriptionist and updated versions of the transcription products are delivered to be included with the media, again subject to configurable thresholds on the estimated accuracy of the transcript products.

In at least one embodiment, a system for delivering one or more transcription products is provided. The system includes a memory, at least one processor coupled to the memory, a customer interface component, an automatic speech recognition component, an editor interface component, and a delivery agent component. The customer interface component is executable by the at least one processor and configured to receive transcription request information identifying at least one media file, the at least one media file including content. The automatic speech recognition component is executable by the at least one processor and configured to generate draft transcription information that represents a draft transcription of the content. The editor interface component is executable by the at least one processor and configured to generate edited transcription information that represents an edited transcription of the content. The delivery agent component is executable by the at least one processor and configured to evaluate first delivery criteria to determine whether to deliver a first transcription product of the one or more transcription products and transmit the first transcription product in response to determining that the first delivery criteria is satisfied.

In the system, the delivery agent component may be configured to transmit the first transcription product at least in part by modifying a web page to embed the first transcription product within the web page as HTML. The delivery agent component may be configured to evaluate the first delivery criteria at least in part by evaluating a schedule. The delivery agent component may be further configured to evaluate second delivery criteria at least in part by calculating a value of a quality metric using the edited transcription information and determining that the value is less than a quality threshold value. The delivery agent component may be further configured to not transmit a second transcription product of the one or more transcription products in response to determining that the value is less than the quality threshold. The delivery agent component may be further configured to transmit at least one of the value of the quality metric and status information. The delivery agent component may be further configured to derive the first transcription product from the draft transcription information.

In the system, the first transcription product may includes at least one of a transcription, metadata descriptive of the transcription, captions, captions encoded in a media file, a summarization, and a keyword. In addition, the editor interface component may be further configured to generate QA transcription information that represents a QA transcription of the content. The delivery agent component may be further configured to evaluate second delivery criteria to determine whether to deliver a second transcription product of the one or more transcription products, evaluate third delivery criteria to determine whether to deliver a third transcription product of the one or more transcription products, and transmit at least one of the second transcription product and the third transcription product in response to determining that at least one of the second delivery criteria and the third delivery criteria is satisfied. The delivery agent component may be further configured to derive the second transcription product from the edited transcription information and derive the third transcription product from the QA transcription information. The delivery agent component may be further configured to receive a request for status information and respond to the request for the status information by transmitting status information descriptive of the QA transcription information.

In the system, the delivery agent component may be further configured to receive a request for a latest transcription product, evaluate the first delivery criteria at least in part by identifying the request for the latest transcription product, evaluate the second delivery criteria at least in part by identifying the request for the latest transcription product, evaluate the third delivery criteria at least in part by identifying the request for the latest transcription product, and respond to the request for the latest transcription product by transmitting the third transcription product. The delivery agent component may be further configured to receive a request for a latest transcription product, evaluate second delivery criteria at least in part by identifying the request for the latest transcription product, evaluate third delivery criteria at least in part by identifying the request for the latest transcription product, and respond to the request for the latest transcription product by transmitting a first portion of the first transcription product and a second portion of a second transcription product.

In the system, the delivery agent component may be configured to evaluate the second delivery criteria at least in part by calculating a first value of a quality metric using the draft transcription information and determining that the first value is less than a first quality threshold value. The delivery agent component may be configured to evaluate the third delivery criteria at least in part by calculating a second value of the quality metric using the first portion and the second portion and determining that the second value is greater than a second quality threshold value. The delivery agent component may be further configured to receive a request for a latest transcription product, evaluate second delivery criteria at least in part by identifying the request for the latest transcription product, evaluate third delivery criteria at least in part by identifying the request for the latest transcription product, and respond to the request for the latest transcription product by transmitting a portion of a second transcription product.

In the system, the delivery agent component may be configured to evaluate the second delivery criteria at least in part by calculating a first value of a quality metric using the draft transcription information and determining that the first value is less than a first quality threshold value. The delivery agent component may be configured to evaluate the third delivery criteria at least in part by calculating a second value of the quality metric using the portion and determining that the second value is greater than a second quality threshold value.

In another embodiment, a method for delivering a one or more transcription products is provided. The method includes acts of receiving, by a customer interface component, transcription request information identifying at least one media file including content; generating, by an automatic speech recognition component, draft transcription information that represents a draft transcription of the content; generating, by an editor interface component, edited transcription information that represents an edited transcription of the content; evaluating, by a delivery agent component, first delivery criteria to determine whether to deliver a first transcription product of the one or more transcription products; and transmitting, by the delivery agent component, the first transcription product in response to determining that the first delivery criteria is satisfied.

The method may further include acts of evaluating, by the delivery agent component, second delivery criteria at least in part by calculating a value of a quality metric using the edited transcription information; determining, by the delivery agent component, that the value is less than a quality threshold value; and not transmitting, by the delivery agent component, a second transcription product of the one or more transcription products in response to determining that the value is less than the quality threshold. The method may further include acts of generating, by the editor interface component, QA transcription information that represents a QA transcription of the content; evaluating, by the delivery agent component, second delivery criteria to determine whether to deliver a second transcription product of the one or more transcription products; evaluating, by the delivery agent component, third delivery criteria to determine whether to deliver a third transcription product of the one or more transcription products; and transmitting, by the delivery agent component, at least one of the second transcription product and the third transcription product in response to determining that at least one of the second delivery criteria and the third delivery criteria is satisfied. The method may further include acts of deriving, by the delivery agent component, the first transcription product from the draft transcription information; deriving, by the delivery agent component, the second transcription product from the edited transcription information; and deriving, by the delivery agent component, the third transcription product from the QA transcription information.

In another embodiment, a non-transitory computer readable medium is provided. The non-transitory computer readable medium stores sequences of computer executable instructions for delivering a one or more transcription products. The sequences of computer executable instructions included instructions that instruct at least one processor to receive, by a customer interface component, transcription request information identifying at least one media file including content; generate, by an automatic speech recognition component, draft transcription information that represents a draft transcription of the content; generate, by an editor interface component, edited transcription information that represents an edited transcription of the content; evaluate, by a delivery agent component, first delivery criteria to determine whether to deliver a first transcription product of the one or more transcription products; and transmit, by the delivery agent component, the first transcription product in response to determining that the first delivery criteria is satisfied.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
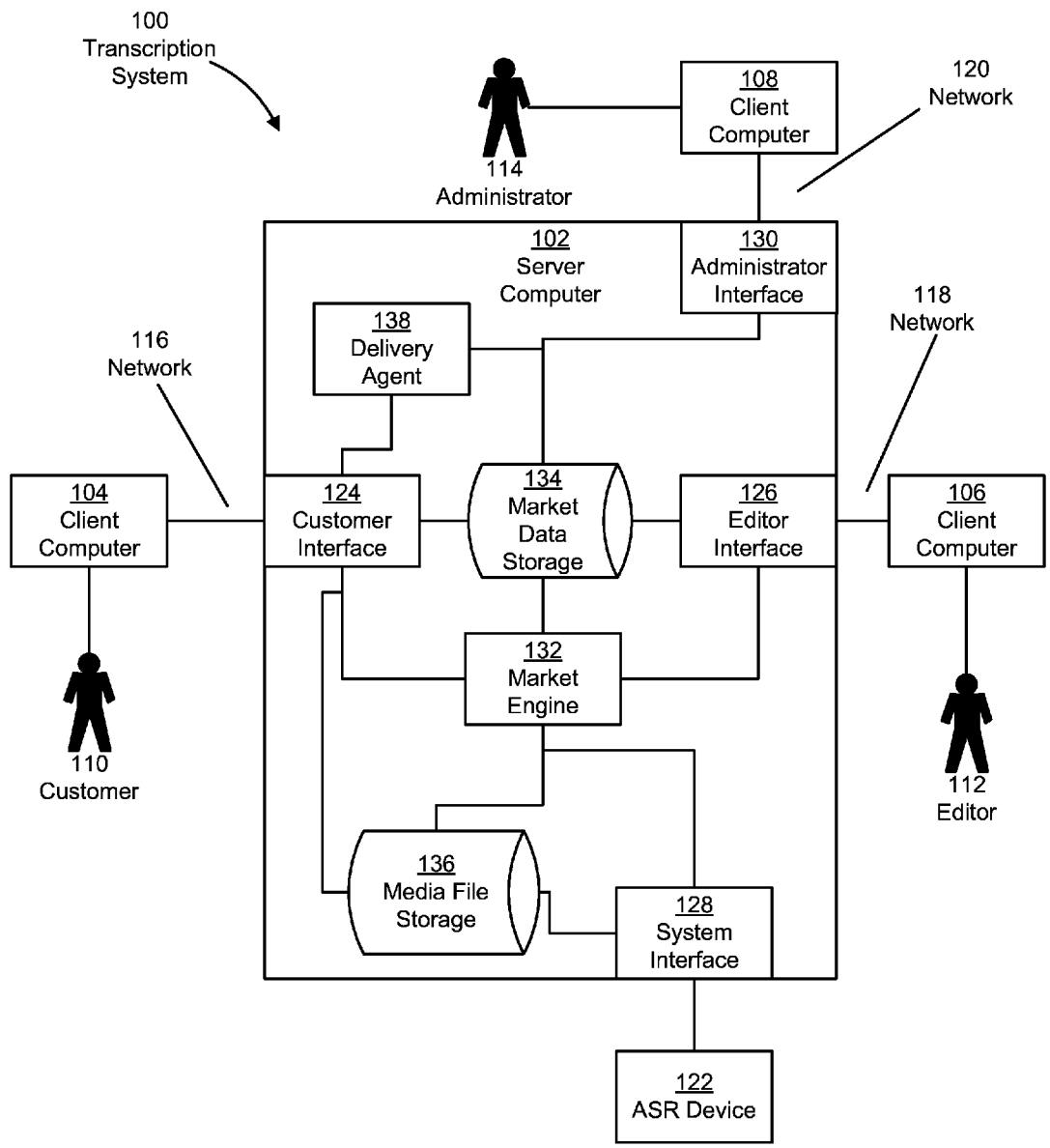
FIG. 1 is a context diagram including an exemplary transcription system.

At least one embodiment disclosed herein includes apparatus and processes for implementing, using a computer system, a transcription job market. In some embodiments, the transcription job market receives transcription request information from customers that identifies media files with encoded audio content that the customers seek to have transcribed. In these embodiments, the transcription job market creates and posts jobs associated with the media files.

In other embodiments, the transcription job market manages market elements to ensure that jobs are being completed according to schedule and with quality. These market elements may include one or more attributes of one or more jobs. In some embodiments, the transcription job market receives information from editors that identifies jobs that the editors seek to complete. In these embodiments, the transcription job market further provides tools used by the editors to complete their transcription tasks. These tasks may produce transcriptions that are time-coded and transcriptions that lack time-coding, i.e., are "non-time-coded."

In some embodiments, the transcription request information may include a schedule that specifies a requested due date and time for one or more transcription products derived from the media files identified in the transcription request information. In at least one embodiment, the transcription request information includes an ASAP due date and time that indicates the customer seeks progressive delivery of the transcription products. In this embodiment, in response to receiving an ASAP due date and time, the transcription job market provides multiple versions of the transcription products to the customer as each version becomes available. Each of these versions may have a higher quality level than its previous version. In some embodiments, the quality level required prior to delivery of each version may be specified by distinct quality threshold criteria. These quality criteria may be included in the transcription request information or may be specified by configurable parameters of the transcription job market.

In other embodiments, the schedule specifies particular status indicators that trigger the creation and delivery of the one or more transcription products. For example, the schedule may specify that identified transcription products are to be delivered after the transcription information from which they are derived has been processed by ASR technology, has been edited by a human, or has been quality checked by a human. Further the schedule may specify that portions of the identified transcription products may be delivered as they become available. For example, the schedule may specify that a transcription segment covering the first five minutes of a thirty minute lecture is to be transmitted upon the segment having passed a quality check by a human.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Transcription System

Various embodiments implement a transcription system using one or more computer systems. FIG. 1 illustrates one of these embodiments, a transcription system 100. As shown, FIG. 1 includes a server computer 102, client computers 104, 106, and 108, a customer 110, an editor 112, an administrator 114, networks 116, 118 and 120, and an automatic speech recognition (ASR) device 122. The server computer 102 includes several components: a customer interface 124, an editor interface 126, a system interface 128, an administrator interface 130, a market engine 132, a market data storage 134, a media file storage 136, and a delivery agent 138.

As shown in FIG. 1, the system interface 128 exchanges (i.e. sends or receives) media file information with the ASR device 122. The customer interface 124 exchanges information with the client computer 104 via the network 116. The editor interface 126 exchanges information with the client computer 106 via the network 118. The networks 116, 118 and 120 may include any communication network through which computer systems may exchange information. For example, the network 116, the network 118, and the network 120 may be a public network, such as the internet, and may include other public or private networks such as LANs, WANs, extranets and intranets.

Information within the transcription system 100, including data within the market data storage 134 and the media file storage 136, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance. In one embodiment, the media file storage 136 includes a file system configured to store media files and other transcription system data and acts as a file server for other components of the transcription system. In another embodiment, the media file storage 136 includes identifiers for files stored on another computer system configured to serve files to the components of the transcription system.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Figure 8:
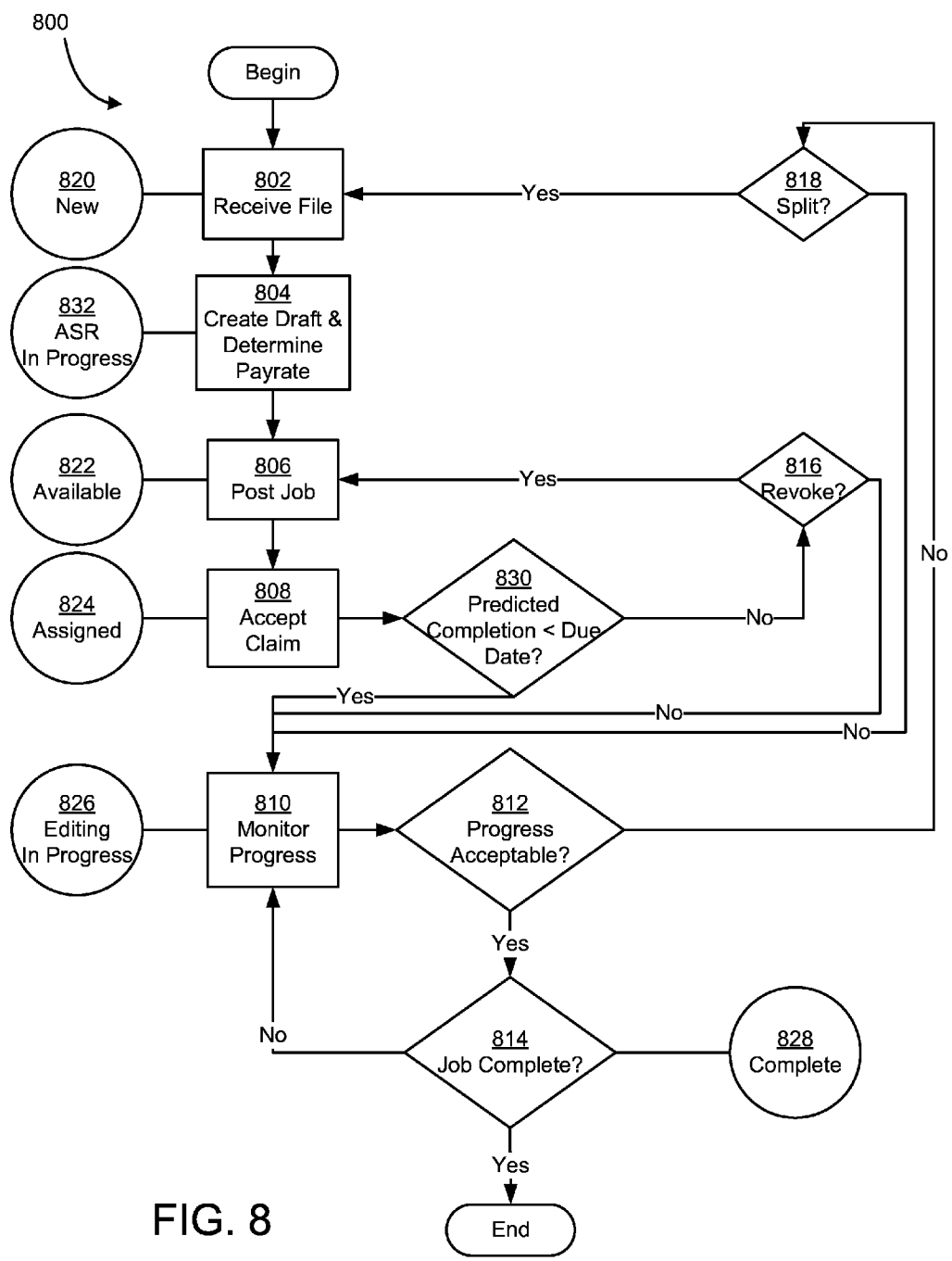
FIG. 8 is a flow diagram illustrating states assumed by a transcription job during execution of an exemplary transcription system.

One goal of the transcription system 100 is to receive media files from customers and to provide both final and intermediate transcriptions of the content included in the media files to the customers. One vehicle used by the transcription system 100 to achieve this goal is a transcription job. Within the transcription system 100, transcription jobs are associated with media files and are capable of assuming several states during processing. FIG. 8 illustrates an exemplary process 800 during the execution of which a transcription job assumes several different states.

As shown in FIG. 8, the process 800 begins when the transcription system 100 receives transcription request information that identifies a media file to transcribe in act 802. The transcription request information may also include delivery criteria that specifies a schedule (e.g., one or more delivery times), quality levels, or other criteria defining conditions to be satisfied prior to delivery of transcription products. In some embodiments, the transcription system 100 receives the transcription request information and the media file via an upload from a customer interface, such as the customer interface 124, or as a result of a previously received media file being split, per act 818 below. Upon receipt of the transcription request information and the media file, the transcription system 100 creates a job, associates the job with the media file, and sets the job to a new state 820. In act 804, the transcription system 100 sets the job to an ASR in progress state 832, generates draft transcription information, and determines a pay rate for the job. When executing the act 804, some embodiments track completion percentage of the draft transcription during ASR processing. Record of completion percentage is used to execute subsequent delivery processes where ASR processing is not complete due to the schedule or interruption by another delivery request. Further, these embodiments compute one or more metrics that characterize the quality of the draft transcription. Draft transcriptions may be full transcriptions or partial transcriptions (where ASR processing is not completed). Some embodiments incorporate information descriptive of the completion percentage and quality metrics into the draft transcription information.

In act 806, the transcription system 100 posts the job, making the job available for editors to claim, and sets the job to an available state 822. Jobs in the available state correspond to draft transcriptions that have completed ASR processing. As described further below, in some embodiments in accord with FIG. 8, the transcription system 100 monitors the due dates and times of available jobs and, if necessary, alters the pay rate (or other job characteristics) of the available jobs to ensure the available jobs are completed by the due date and time.

In act 808, the transcription system 100 accepts an offer by an editor to claim the job and sets the job to an assigned state 824. In the illustrated embodiment, jobs in the assigned state 824 are not available for claiming by other editors. In act 830, the transcription system 100 determines whether the predicted completion date and time for the job, as assigned, occurs before the due date and time. If so, the transcription system 100 executes act 810. Otherwise the transcription system 100 executes act 816.

In the act 816, the transcription system 100 determines whether to revoke the job. If so, the transcription system executes the act 806. Otherwise, the transcription system 100 executes the act 810.

In the act 810, the transcription system 100 records and monitors actual progress in transcribing the media file associated with the job, as the progress is being made by editors. Also in the act 810, the transcription system 100 sets the job to an editing in progress state 826.

In the act 812, the transcription system 100 determines whether the job is progressing according to schedule. If so, the transcription system executes act 814. Otherwise, the transcription system executes act 818.

In the act 818, the transcription system 100 determines whether to split the media file associated with the job into multiple media files. For example, the transcription system may split the media file into one segment for any work already completed and into another segment for work yet to be completed. This split may enable the transcription system 100 to further improve the quality on a segment by segment basis. For example, a segment which has been edited may be split from other segments so that the edited segment may proceed to quality assurance (QA). Thus splitting the media file may enable the transcription system to provide partial but progressive delivery of one or more transcription products to customers. If the transcription system 100 splits the media file, the transcription system 100 stores the edited, completed segment and executes the act 802 for any segments that include content not completely transcribed. If, in the act 818, the transcription system 100 determines to not split the media file, the transcription system executes the act 810.

In the act 814, the transcription system 100 determines whether the content of the media file associated with the job is completely transcribed. If so, the transcription system 100 stores the edited, complete transcription and sets the state of the job to a complete state 828, and the process 800 ends. Otherwise, the transcription system 100 executes the act 810.

In some embodiments, completed transcriptions may be the subject of other jobs, such as QA jobs, as described further below. Components included within various embodiments of the transcription system 100, and acts performed as part of the process 800 by these components, are described further below.

According to various embodiments illustrated by FIG. 1, the market engine 132 is configured to both add jobs to the transcription job market provided by the transcription system 100 and to maintain the efficiency of the transcription job market once the market is operational. To achieve these goals, in some embodiments, the market engine 132 exchanges market information with the customer interface 124, the administrator interface 130, the editor interface 126, the system interface 128, the market data storage 134, the media file storage 136 and the delivery agent 138. Market information may include any information used to maintain the transcription job market or stored within the market data storage 134. Specific examples of market information include media file information, job information, customer information, editor information, administrator information and transcription request information. Each of these types of information is described further below with reference to FIG. 2.

In some embodiments, the market engine 132 is configured to identify unprocessed media files stored in the media file storage 136. In some of these embodiments, the market engine 132 identifies unprocessed media files after receiving an indication of the storage of one or more unprocessed media files from another component, such as the customer interface 124, which is described further below. In others of these embodiments, the market engine 132 identifies unprocessed media files by periodically executing a query, or some other identification process, that identifies new, unprocessed media files by referencing information stored in the market data storage 134 or the media file storage 136. In some embodiments, the market engine 132 is also configured to send a request for ASR processing of unprocessed media files to the system interface 128. This request may include information specifying that only a limited portion of the unprocessed media file (e.g., a specified time period) be processed. Further, in at least one embodiment, the market engine 132 tracks completion percentage of the draft transcription during subsequent ASR processing. The market engine 132 may store, in the market data storage 134, the completion percentage associated with partial transcriptions stored in the media file storage 136.

In these embodiments, the system interface 128 is configured to receive requests for ASR processing, and, in response to these requests, provide the unprocessed media files to the ASR device 122, along with any requested limits on the ASR processing. The ASR device 122 is configured to receive a media file, to perform transcoding and automatic speech recognition on the received media file in accord with the request and to respond with draft transcription information that includes a draft (time-coded or non-time-coded) transcription of the content of the received media file and a predicted cost of editing the draft transcription. This predicted cost, referred to herein as the ASR_cost is based on information computed as part of the ASR processing and a cost model. The cost model may be a general model or may be associated with the project, customer or editor associated with the media file. A project is a set of media files grouped by a customer according to domain, due date and time or other media file attribute. Projects are described further below. Cost models predict the cost of editing a draft transcription and are described further with reference to FIG. 2 below. The system interface 128 is further configured to receive the draft transcription information, store the draft transcription information in the media file storage 136, store the location of the draft transcription information in the market data storage 134, and notify the market engine 132 of the availability of the draft transcription information.

In one example illustrated by FIG. 1, the market engine 132 receives an identifier of a newly stored media file from the customer interface 124. Responsive to receipt of this identifier, the market engine 132 provides a request to perform ASR processing on the media file to the system interface 128. The system interface 128, in turn, retrieves the media file from the media file storage 136 and provides the media file, along with a set of parameters that indicate appropriate language, acoustic, cost and formatting models, to the ASR device 122. The ASR device 122 responds with draft transcription information that includes a time-coded draft transcription, lattices, search statistics, ASR_cost and other associated data. The system interface 128 receives the draft transcription information, stores the draft transcription information in the media file storage 136, stores the location of the draft transcription information in the market data storage 134 and notifies the market engine 132 of the availability of the draft transcription information.

In other embodiments, the market engine 132 is configured to perform a variety of processes in response to receiving a notification that draft transcription information is available. For instance, in one example, after receiving a notification that draft transcription information is available, the market engine 132 notifies the delivery agent 138 that draft transcription information is available by providing the delivery agent 138 with a notification describing the location and status of the draft transcription information. In another example, the market engine 132 employs natural language processing techniques to determine the type of content or domain included in the media file associated with the draft transcription information and stores this information in the market data storage 134. In another example, the market engine 132 determines the duration of the content included in the media file and stores the duration in the market data storage 134. In another example, after receiving a notification that draft transcription information is available, the market engine 132 determines an initial pay rate for editing the draft transcription included in the draft transcription information and stores job information associated with the draft transcription in the market data storage 134. In this example, the initial pay rate included in the job information is determined using the due date and time, difficulty, duration, domain and ASR_cost of the media file associated with the draft transcription information. In other examples, other combinations of these factors may be used, or these factors may be weighted differently from one another. For instance, in one example, due date and time and duration may be replaced with times-real-time. In another example, the weight applied to any particular factor may be 0.

In other embodiments, the market engine 132 is configured to periodically publish, or "push," notifications to editors that indicate the availability of new jobs. In one of these embodiments, the market engine 132 tailors these notifications by sending them only to particular editors or groups of editors, such as those editors who have permission to edit the jobs. In other embodiments, the market engine 132 tailors notifications based on other job characteristics, such as the type of job (editing, QA, etc), difficult, domain or due date and time. In some examples, the market engine 132 sends notifications to editors based on their ability to complete jobs having the attribute to which that the notification is tailored. Continuing the previous examples, the market engine 132 may send notifications to editors who may assume particular roles (editor, QA, etc.), who have a track record of handling difficult jobs, who are well versed in a particular domain or who are highly efficient.

In at least one embodiment, the market engine 132 notifies editors of near-term future job availability based on the upstream workflow. In this embodiment, as files are being uploaded by customers and processed by the ASR device, the market engine 132 predicts how many more jobs will be available and based on one or more the attributes of these jobs, such as duration, domain, etc., the market engine 132 sends out advanced notice to one or more editors via the editor interface 126.

In other embodiments, the market engine 132 is configured to determine the difficulty of successfully editing the draft transcription and store the difficulty in the market data storage 134. In these embodiments, the market engine 132 may base this determination on a variety of factors. For example, in one embodiment, the market engine 132 calculates the difficulty using an equation that includes weighted variables for one or more of the following factors: the content type (domain) of the media file, the historical difficulty of media files from the customer (or the project), the draft transcription information, and acoustic factors (such as noise-level, signal-to-noise-ratio, bandwidth, and distortion).

In some embodiments, the market engine 132 is configured to create and post jobs corresponding to unedited media files, thereby making the jobs available to the editors for claiming and completion. According to one example, as part of this processing, the market engine 132 stores an association between each job and a media file targeted for work by the job. This action is performed so that factors affecting pay rate, such as those described above, can be located in a media file table.

As described further below with reference to the editor interface 126, editors claim jobs by indicating their preferences on a user interface provided by the editor interface 126. After a job is claimed, the job is removed from the market, so that no other editors can access the job. However, until the editor has actually begun to edit the job, it is relatively easy for the job to be put back on the market. Typically, leaving the original claim in place is preferred. However, in some embodiments, the market engine 132 is configured to determine whether the editor who claimed the job will be able to complete the job before the due date and time. In these embodiments, the market engine 132 is configured to make this determination based on the job characteristics (difficulty, domain, duration, etc.) and the editor's historical proficiency as stored in the market data storage 134. For example, the editor may be associated with a times-real-time statistic stored in the market data storage 134. The times-real-time statistic measures editor productivity and is calculated by dividing the time it takes for the editor to complete each job by the duration of the media file associated with each job. In some embodiments, the market engine 132 is configured to use this statistic to estimate the completion time of the job (based on duration multiplied by times-real-time). In some embodiments, the market engine 132 is configured to condition this statistic based on job attributes, and thus compute the statistic from similar jobs performed by the editor in the past. The set of historical jobs used to compute the times-real-time statistic may include all jobs performed by the editor, a subset of jobs which have similar attributes to the present job, or other combinations of historical jobs, including those that were not performed by the editor. The market engine 132 may calculate this statistic as a mean, a median, a duration-weighted mean, or using summaries of historical processing times for the editor or other editors for different media file subsets.

In other embodiments, if the market engine 132 determines that an editor may be unlikely to complete a job before the due date and time, the market engine 132 may reverse the assignment and put the job back on the market, thus allowing some number of other editors to claim the job. In some these embodiments, the market engine 132 determines the likelihood that the editor will complete the job before its due date and time using one or more of the following factors: historical productivity of the editor (in general or, more specifically, when editing media files having a characteristic in common with the media file associated with the job); the number of jobs currently claimed by the editor; the number of jobs the editor has in progress; and the due dates and times of the jobs claimed by the editor. When the market engine 132 reverses an assignment, the original editor is informed of this condition via the editor interface 126. The market engine 132 may or may not allow the original editor to reclaim the job from the market, depending on whether data indicates interest of other editors in the job. One example of an indicator of interest is whether the job is being previewed by any other editors. Another factor which may influence this decision is if the total volume of unedited draft transcriptions exceeds a threshold.

In some embodiments, the market engine 132 determines a likelihood of completion for each possible combination of editor and job. In these embodiments, the market engine 132 may calculate this likelihood using any combination of the factors discussed above (historical productivity, number of jobs claimed, number of jobs in progress, due dates and times of claimed jobs, etc.). Further, in some embodiments, the market engine 132 prevents editors from claiming jobs for which the editor's likelihood of completion metric transgresses a threshold. In these embodiments, the threshold is a configurable parameter. Further, according to these embodiments, the market engine 132 may prevent an editor from claiming a job in a variety of ways including rejecting an offer from the editor to claim the job and causing the job to not be display to the editor within the editor interface 126 via, for example, a meta rule. Meta rules are discussed further below.

In other embodiments, if the market engine 132 determines that an editor may be unlikely to complete a job before the due date and time, the market engine 132 sends a notification to the editor who claimed the job via the editor interface 126. The notification may include a variety of information, such as a notification that the job may be revoked shortly or including a link to allow the editor to voluntarily release the job.

In several embodiments, the market engine 132 is configured to give permission to many editors to edit the same draft transcription and to offer all editors the same pay rate to do so. In some alternative embodiments, however, the market engine 132 is configured to determine if, based on historical information, some editors display an increased proficiency with particular types of media files (for example in certain domains) and to increase the pay rate for these editors when transcribing media files having the particular type. In addition, some embodiments of the market engine 132 are configured to adjust the pay rate based on overall editor experience levels, as well as the historical productivity of the editors, both in general and on the type of media file for which the rate is being set.

In general, the market engine 132 sets the pay rate based on the aforementioned factors, such as job difficulty, required times-real-time, and ASR_cost. However, to maintain an efficient market in some embodiments, the market engine 132 is configured to determine when market conditions suggest intervening actions and to, in some cases, automatically take those intervening actions. For example, when the market is saturated with non-difficult jobs, an abnormally large amount of unassigned, difficult jobs may develop. According to this example, to correct the inefficiency in the market, the market engine 132 intervenes by increasing the pay rate of difficult jobs or decreasing the pay rate of low difficulty jobs. In still another example, the market engine 132 intervenes to increase the pay rate of a job where the proximity of the current date and time and due date and time for the media file associated with the job transgresses a threshold.

In some embodiments, the market engine 132 is configured to use the preview functionality as an indicator of job difficulty and appropriate pay rate. For instance, in one example, the market engine 132 detects that the number of editors that have previewed a job and not claimed it has exceeded a threshold. Alternatively, in another example, the market engine 132 detects that the total preview duration of an unclaimed job has transgressed a threshold. These phenomena may indicate that the job is more difficult than is reflected by the current pay rate. The market engine 132 may then intervene to increase the pay rate to improve the chance that the job will be claimed or to split the file into segments.

Additionally, in some embodiments, the market engine 132 monitors the status of, and information associated with, all jobs available on the market. This information includes difficulty, pay rate, due date and time, domain and summary information such as the number of editors with permission to edit a draft transcription, the amount of time a job has been on the market, the number of previews of the media file associated with a job, and other data concerning the market status of the job and its associated media file. In some embodiments, the market engine 132 is configured to use this information to ensure that problem jobs are accepted. For example, the market engine 132 may increase the pay rate, may enable a larger number of editors to access to the file, or may cut the file into shorter segments—thus producing several less difficult editing jobs for the same media file.

In other embodiments, the market engine 132 is configured to, under certain conditions, hide some of the low difficulty jobs in order to create a more competitive environment or to induce editors to work on difficult jobs. Additionally, in some embodiments, the market engine 132 is configured to encourage the editors to accept less desirable jobs by bundling jobs together with more desirable jobs. For example, the market engine 132 may group a selection of jobs with variable difficulty together so that a single editor would need to claim all of these jobs, instead of claiming only low difficulty jobs. Other characteristics that may determine the desirability of a job, and which may be used to determine the bundling, include customer, project, domain (e.g. interesting content), and historical time waiting on the market for the customer/project.

In some embodiments, the market engine 132 is configured to analyze the overall status of the market prior to modifying job characteristics. For instance, in one example, the market engine 132 monitors the amount of work available in the market, and if the amount transgresses a threshold, increases the pay rate for jobs that are within a threshold value of their due dates and times. In other embodiments, the market engine 132 is configured to analyze the dynamics of the overall market to determine intervening actions to perform. In one example, the market engine 132 measures the rate at which jobs are being accepted and measures the number of jobs or duration of the jobs, and estimates the time at which only the least popular jobs will remain in the market. If the market engine determines that this time is sufficiently ahead of the due date and time for these jobs, then the market engine 132 may wait before increasing the pay rate.

In other embodiments, the market engine 132 is configured to set meta rules to affect the behavior of the market. Meta rules globally modify the behavior of the market by affecting how all or some of the available jobs will appear on the market. For instance, the market engine 132 may set a meta rule that prevents some percentage of the jobs from being available to any editors for a certain time period. The market engine 132 may use this rule during periods when there is a surplus of work, and therefore help to smooth out the flow of files through the system. Or, the market engine 132 may set a meta rule to make files available only to relatively inexperienced editors for a certain time period. The market engine 132 may use this rule where many relatively easy jobs are being processed by the market, so that the market presents a good opportunity to give less experienced editors more work in learning how to efficiently operate the editing platform. Or, the market engine 132 may set a meta rule that automatically send some percentage of jobs to multiple editors for cross-validation. Various embodiments may implement a variety of meta rules, and embodiments are not limited to a particular meta rule or set of meta rules.

In other embodiments, the market engine 132 is configured to implement a rewards program to encourage editors to claim difficult jobs. In one embodiment, the market engine 132 issues rewards points to editors for completing files and bonus points for completing difficult files. In this embodiment, the editor interface 126 is configured to serve a rewards screen via the user interface rendered on the client computer 106. The rewards screen is configured to receive requests to redeem reward and bonus points for goods and services or access to low difficulty media files.

In some embodiments, the market engine 132 is configured to estimate the expected completion time of the editing job and further refine the market clearing processes discussed above. If the market engine 132 determines that the current progress is not sufficient to complete the file on time, the editor may be notified of this fact via the editor interface 126, and, should the condition persist, the market engine 132 is configured to make the job available to other editors (i.e. to put the jobs back on the market). In some circumstances, the market engine 132 may revoke the entire job from the original editor. In this case, the job is put back on the market as if no work had been done. In other cases, the market engine 132 may dynamically split the job at the point where the original editor has completed editing, creating one or more new jobs that are comprised of the remaining file content. The market engine 132 puts these one or more new jobs on the market, and the original editor is paid only for the completed work. In this situation, the market engine 132 may notify the delivery agent 138 of the status and location of any completed transcription segments. This functionality enables partial and progressive delivery to the customer of transcription products based on the completed segments, as described further below with reference to the delivery agent 138 and the processes it executes.

In some embodiments, the market engine 132 is configured to process a delivery request or partial delivery request received from another component, such as the customer interface 124. In these embodiments, in response to receiving a delivery request, the market engine 132 determines the status and location of the transcription identified in the request and provides a notification including the status and location information the delivery agent 138. In response to receiving a partial delivery request targeting a media file being processed in a job, the market engine 132 dynamically splits the job at the point where the original editor has completed editing and creates one or more new jobs that are comprised of the remaining file content. The market engine 132 puts these one or more new jobs on the market, and the original editor is paid only for the completed work. Further, in these embodiments, the market engine 132 notifies the delivery agent 138 of the status and location of completed segments stored as a result of the job split. It is appreciate that the splitting functionality described herein may apply to any jobs being processed by the transcription system 100, such as QA jobs.

In another embodiment, in response to receiving a partial delivery request targeting a media file being processed in a job, the market engine 132 stores one or more segments of the transcription up to the point where the editor has completed editing without interrupting the job. In this embodiment, the market engine 132 notifies the delivery agent 138 of the status and location of completed segments.

In other embodiments, the market engine 132 is configured to perform a variety of processes after receiving an indication that a job has been completed. For example, if a newly completed draft transcription information was split into segments, then the market engine 132 concatenates completed segments together into a completed transcript. In another example, the market engine 132 notifies the delivery agent 138 of the location and status of the completed transcript.

In another example, the market engine 132 is configured to compare the completed time-coded transcript with the draft transcription produced by the ASR device 122. In this example, the market engine 132 uses the number of corrections performed on the transcript to compute a standard distance metric, such as the Levenshtein distance. The market engine 132 stores this measurement in the market data storage 134 for later use in determining an objective difficulty for the editing job.

In various embodiments, the market engine 132 is configured to use the objective difficulty in a variety of processes. For example, in some embodiments, the market engine 132 uses the objective difficulty for a set of jobs to adjust the historical times-real-time statistic for an editor to determine the actual price that the customer pays for the transcription service, or as input to the automated difficulty-determination process discussed herein.

In other embodiments, the market engine 132 is configured to, prior to making the completed transcript available to the customer, create and post a new job to validate the completed transcription or the completed segments of a transcription. For example, in one embodiment, the market engine 132 creates and posts a QA job on the same market as the editing jobs. This QA job may target completed transcriptions or a completed segment of a transcription. A subset of editors may be qualified for the QA role, and the profiles of this subset may include a QA attribute. These editors would then be permitted to view, preview, and claim the QA jobs in the market via the editor interface 126. However, the editor of the original transcript would not have permission to QA their own job, even if the editor in general is qualified to perform in a QA role. The profiles of some editors may include a QA attribute, but lack an editor attribute. These editors would only be permitted to view, preview, and claim QA jobs.

As the QA jobs normally require much less work than the original editing job, in some embodiments, the market engine 132 is configured to set the pay rate for the QA jobs at a lower level. However, in other embodiments, the market engine 132 is configured to monitor and adjust the pay rate for the QA jobs as for the editing jobs, with similar factors determining the pay rate, including file difficulty, the ASR_ cost, the proximity of the file due date and time, and the media file duration. Additionally, in some embodiments, the market engine 132 is configured to use QA-specific factors to determine the pay rate for QA jobs. For example, in one embodiment, the market engine 132 adjusts the pay rate based on the number of flags in the edited transcript, the historical proficiency of the original editor, the times-real-time it took to produce the completed transcription, and the ASR distance metric for the media file. Flags are set during the editing process and indicate problem content within the edited transcript. For example, flags may indicate content that is unclear or that requires additional research to ensure accurate spelling. In some embodiments, the flags are standardized to facilitate automatic processing by the components of the transcription system.

After this QA processing is complete, in some embodiments, the market engine 132 is configured to make the final time-coded transcription or its final time-coded segments available to the customer, who may then download the transcription or transcription segments for his or her own use via the customer interface 124. In other embodiments, after the QA processing is complete, the market engine 132 notifies the delivery agent 138 of the status and location of the final time-coded transcription or its final time-coded segments. The final transcription or its final segments is also maintained in the media file storage 136 for reference and further processing, as discussed herein.

In some embodiments, to periodically measure editor proficiency, the market engine 132 is configured to allow a media file to be edited by multiple editors. For instance, in one example, the market engine 132 periodically creates several different editing jobs from the same media file, and these jobs are claimed and processed by multiple editors. The market engine 132 tracks the underlying media file and does not assign more than one of these jobs to the same editor. After several editors edit the same file, the market engine 132 executes a ROVER or similar process to determine intra-editor agreement, and thereby assign quality scores to individual editors, the quality score being proportional to the number of words in the editor's final transcript, which have high agreement among the other editors. In addition, the market engine 132 may use the ROVER process to produce the final transcript. In this case, the market engine 132 may assign different weights to different editors based on the editor characteristics (domain or customer expertise, historical transcription proficiency, etc).

In other embodiments, the market engine 132 is configured to build cost models that are used to determine predicted costs for editing draft transcriptions. In some of these embodiments, the market engine 132 is configured to generate cost models based on variety of information including historical productivity information, such as times-real-time statistics and ASR distance information. Further, in these embodiments, the cost models may be specific to particular editors, customers or projects. For instance, in one example, the market engine 132 builds cost models that accept a unique identifier for a media file, the ASR information (time-coded draft transcription, lattices, search statistics, acoustic characteristics) for the media file, and an indication of an editor, customer or project associated with the media file and that return a projected transcription cost that is conditioned on historical productivity associated with the editor, customer or project. Once these models are built, the market engine 132 stores them in the media file storage 136.

In some embodiments, the delivery agent 138 is configured to progressively deliver transcription products to customers. When executing according to this configuration, the delivery agent 138 exchanges market information with customer interface 124, the market engine 132, the market data storage 134 and the media file storage 136. Market information may include any information used to maintain the transcription job market or stored within the market data storage 134. Specific examples of market information include media file information, job information, customer information, editor information, administrator information and transcription request information. Each of these types of information is described further below with reference to FIG. 2.

In some embodiments, the delivery agent 138 is configured to receive notifications from other components of the transcription system 100, such as the customer interface 124 and the market engine 132. These notifications may include transcription request information and may describe the status and location of transcription information corresponding to a media file being processed by the transcription system 100. In some embodiments, in response to receiving these notifications, the delivery agent 138 may take one of several actions as specified by previously received parameters and the transcription request information.

For example, the delivery agent 138 may create transcription products using the transcription information. These transcription products may include transcriptions (e.g., time-coded and non-time-coded), captions frames (such as those described in the "Intelligent Captions" application and the "Automated caption positioning" provisional application), captions encoded in media files (for example, a copy of the media file uploaded to the system), and auxiliary deliverables such as search keywords, descriptive summarization, and other metadata derived either automatically or manually from the transcription information. These auxiliary products may be derived automatically from the transcription at any stage using natural language processing algorithms, such as TextRank, GRASSHOPPER, and maximum entropy modeling. The auxiliary deliverables may be used on web-sites to optimize for search engine ranking of the page by, for example, directly encoding the auxiliary deliverables into the HTML that constitutes the web-sites.

As described in the "Intelligent Captions" application, in some embodiments the delivery agent 138 produces caption frames from the transcription information via natural language processes which determine syntactic boundaries, for example sentence and paragraph boundaries. The delivery agent 138 may convert caption frames into various caption formats for embedding internet-based media players, or may include the caption frames directly into a version of the original media file to provide open or closed caption playback for the media file.

In some embodiments, the delivery agent 138 is configured to automatically exchange status information with the client computer 104. For example, in one embodiment, the delivery agent 138 may receive transcription request information that includes a "status postback" URL which is stored in the market data storage 134 in association with the media file. In this embodiment, the delivery agent 138 periodically posts an HTTP request to this URL which includes information about the transcription product status. Examples of status information include: "automatic transcription 25% complete", "automatic transcription complete", "editing pass 50% complete", "QA 75% complete", "final transcript complete", etc. The status information may also include the estimated accuracy of the transcription information at its current stage of processing, the estimated completion time of the current stage of processing, the estimated delivery time of the final transcription, the number of flagged tokens in the current transcription, etc. The delivery agent 138 may also exchange status information with the client computer in response to a request to do so transmitted by the client computer 104.

In some embodiments, the delivery agent 138 is configured to automatically create and transmit transcription products to the client computer 104. In some of these embodiments, when executing according to this configuration, the delivery agent 138 identifies transcription products that are ready for transmission via the customer interface 124 in response to receiving transcription request information from the customer interface 124. This transcription request information may be originally received by the customer interface 124 through an HTTP API and may include information identifying the transcription products and requesting immediate delivery of the transcription products. In others of these embodiments, the delivery agent 138 identifies transcription products that are ready for delivery by periodically executing a query, or some other identification process, that identifies transcription products by referencing information stored in the market data storage 134 or the media file storage 136. This query may be executed according to one or more configurable parameters stored in the market data storage 134.

For example, the customer's system (e.g., client computer 104) may be configured to request a transcription be delivered when a status postback generated by the delivery agent 138 indicates that the editing stage of processing is complete (but prior to the QA stage of processing). This request for transcription delivery may be encoded into transcription request information indicating immediate delivery of a transcription. Alternatively, the customer's system may be configured to request the transcription when a quality metric (e.g. estimated accuracy) in the status postback request is above a given quality threshold value. According to this example, the delivery agent 138 responds to receipt of the transcription request information by transmitting the requested transcription to the customer's computer.

In another example, the delivery agent 138 is configured to compute a quality metric (e.g., a confidence level or estimated accuracy) for transcriptions as the transcriptions are processed and edited in the transcription system 100. When executing according to this configuration, the delivery agent 138 computes the quality metric using measures derived from the transcoding, automatic speech recognition or natural language processes. For example, the delivery agent 138 may compute a quality metric using ASR lattice depth, acoustic model scores, language model scores, internal search metrics, audio quality measure, and metadata associated with the media file, such as duration, project, and customer. In some embodiments, the delivery agent 138 determines the quality metric by mapping a confidence level into a range that is indicative of an estimated accuracy for the draft transcription. In at least one embodiment, the delivery agent 138 associates quality metrics with sub-regions of the draft transcription, for example words, textual tokens, sentences, and paragraphs. These quality metrics may be similar to—or the same as—those used in computation of the ASR_cost.

In some embodiments, the delivery agent 138 is configured to use the quality metric to determine whether or not the transcription products are automatically delivered to the customer's system or web page. For example, a customer may configure a quality threshold value for the quality metric (e.g. through either a configurable parameter in the transcription system 100 or transcription request information). The delivery agent 138 may transmit transcription products derived from a transcription where the quality metric value exceeds a quality threshold value, for example 80% estimated accuracy. In other embodiments, where quality metric value is computed for sub-regions of the transcription, the delivery agent 138 may provide only those sub-regions whose quality metric values exceed the configured quality threshold value. In at least one embodiment, the delivery agent 138 is configured to restrict delivery of sub-regions to sub-regions of sentence length or greater. Since the transcription products produced from this subsetting process are time-coded, omission of the lower-quality regions would not pose a problem for the experience.

In another embodiment, the delivery agent 138 is configured to create and transmit transcription products based on partial transcription information. In some of these embodiments, when executing according to this configuration, the delivery agent 138 identifies transcription products that are ready for transmission via the customer interface 124 in response to receiving transcription request information from the customer interface 124. This transcription request information may be originally received by the customer interface 124 through an HTTP API and may include information identifying the transcription products and requesting immediate delivery of portions of the transcription products. In others of these embodiments, the delivery agent 138 identifies transcription products that are ready for partial delivery by periodically executing a query, or some other identification process, that identifies transcription products by referencing information stored in the market data storage 134 or the media file storage 136. This query may be executed according to one or more configurable parameters stored in the market data storage 134.

For example, in one embodiment, the delivery agent 138 is configured to deliver a portion of an automatically generated draft transcription (whatever portion of the draft transcription has been completed) to the customer system after a specified duration of the audio has been processed. Or, the customer system may be configured to request the latest available transcription products after a configurable period of processing time (e.g. post initial file delivery) has elapsed. In this case, the delivery agent 138 is configured to deliver the latest available transcription products to the customer's system, since this will have the greatest accuracy. For instance, if the editing stage of processing is partially completed, the delivery agent 138 delivers to the customer's system a version of the transcription that is partially edited by the human transcriptionist, and is otherwise comprised of the automated draft transcription, along with other transcription products produced from this partially edited transcription. Similarly, if the file were, at the time of the customer request, in the midst of the QA stage of processing, the delivered transcription products would be partially checked (and possibly modified) by the QA expert, and otherwise comprised of or derived from the transcription produced by the human editor.

In some embodiments, the delivery agent 138 is configured to use a quality metric to determine whether or not the transcription products based on a partially processed transcription are automatically created and delivered to the customer's system or web page. For example, in the case where a transcription product based on partially edited transcript is requested by the customer system, the quality metric threshold value would be applied to the current state of the transcription. In one case where the quality metric is estimated accuracy, the value of the estimated accuracy is computed from a weighted sum of the average final editing accuracy (e.g., 99%) and the estimated accuracy computed from the draft transcription information. In at least one embodiment, the delivery agent 138 is configured to weight the editing accuracy proportionally to the percentage of the transcript which had been edited and weight the estimated accuracy proportionally to the remaining percentage:

$$\text{Estimated\_Accuracy} = (\text{Percent\_Editing\_Completed} \times 0.99) + ((1 - \text{Percent\_Editing\_Completed}) \times \text{Estimated\_Automated\_Accuracy})$$

In some embodiments, the delivery agent 138 is configured to modify the Estimated_Accuracy described above by the actual accuracy determined by the edits that have been completed. For example, if the Estimated_Accuracy is 82%, but the observed accuracy computed, for example, by a Levenshtein distance between the edited transcription and the draft transcription (for the edited portion only) was 85%, the delivery agent 138 would increase the Estimated_Accuracy to 85%, or to a value somewhere between 82% and 85%, in proportion to the Percent_Editing_Completed factor. In some embodiments, the delivery agent 138 computes a similar calculation on the transcription during the QA stage of the processing, where the average editing accuracy is interpolated with the average QA accuracy (e.g., 99.6%), again, according to how much of the transcript has been processed by QA (e.g. a Percent_QA_completed factor) at the time of the delivery request.

In some embodiments, the delivery agent 138 is configured to evaluate a distinct accuracy threshold for each potential delivery. For example, the threshold might increase as the final file deadline approaches, so that a less accurate transcription may be acceptable earlier in the process, whereas the most accurate transcription would be required at the deadline.

In some embodiments, the delivery agent 138 is configured to automatically transmit transcription products by embedding the transcription products directly onto a web page, for example by modifying plugin HTML code to point to the updated resource URL or executing an HTTP API to modify the web page HTML code. In other embodiments, the delivery agent 138 is configured to transmit the transcription products to an FTP folder specified in the transcription request information or a configurable parameter.

While the delivery agent 138 is illustrated as a component distinct from the market engine 132 in FIG. 1, it is appreciated that the delivery agent 138 may be incorporated into the market engine 132 according to some embodiments. In addition, processes executed by the delivery agent 138 according to various embodiments are described further below with reference to FIG. 9.

In some embodiments, customers may be given access to the transcripts for final editing via the customer interface 124. In these embodiments, the market engine 132 uses the customer edits as the gold-standard reference for computing editor accuracy. In other embodiments, the market engine 132 is configured to use times-real-time, stored in the market data storage at the time of job upload, as a factor in determining editor proficiency. Typically, the market engine 132 also adjusts the editing time (and thus the historical editing productivity for editors) by an objective difficulty, such as the ASR distance, because more difficult files will necessarily take longer to edit.

In some embodiments, the customer interface 124 is configured to provide a user interface to the customer 110 via the network 116 and the client computer 104. For instance, in one embodiment, the customer interface 124 is configured to serve a browser-based user interface to the customer 110 that is rendered by a web-browser running on the client computer 104. In this embodiment, the customer interface 124 exchanges customer and media file information with the customer 110 via this user interface. Media file information may include one or more media files or information descriptive of the attributes of one or more media files. Specific examples of media file information include a media file to be transcribed, a type of content included in a media file, a date and time a transcription of a media file is due, a domain of the subject matter presented in the content, a unique identifier of a media file and storage location of a media file. Media file information is described further below with reference to FIG. 2.

According to an example illustrated by FIG. 1, the customer interface 124 receives media file information from the user interface. This media file information includes a media file and information indicating a date and time that transcription of the media file is due and a type of content included in the media file. Responsive to receipt of this media file information, the customer interface 124 stores the media files in the media file storage 136 and stores a unique identifier of the media file, the due date and time, and the content type in the market data storage 134.

According to an example illustrated by FIG. 1, the customer interface 124 receives media file information from the user interface. This media file information includes a media file and media file information indicating a domain of the subject matter of the content included in the media file or a project to be associated with the media file from which the domain may be derived. Responsive to receipt of this media file information, the customer interface 124 stores the media files in the media file storage 136 and stores a unique identifier of the media file and other media file information in the market data storage 134.

According to another example illustrated by FIG. 1, the customer interface 124 provides media file information to the user interface. This media file information includes unique identifiers of one or more media files previously received from the customer 110, the due dates and times associated with the received media files, and the project information associated with the received media files. In this example, the customer interface 124 receives modifications to the provided media file information made by the customer 110 via the user interface. Responsive to receiving the modifications, the customer interface 124 stores the modifications in the market data storage 134.

According to another example illustrated by FIG. 1, the customer interface 124 provides media file information to the user interface. This media file information includes one or more unique identifiers of one or more media files previously received from the customer 110 and other attributes of these files including, for example, the due dates and times, content types, prices, difficulties, and statuses or states of jobs associated with the previously received media files. As discussed above with reference to FIG. 8, examples of job states include New, ASR_In_Progress, Available, Assigned, Editing_In_Progress, and Complete. In some embodiments, the customer interface 124 serves media file information as one web page, while in other embodiments, the customer interface 124 serves this media file information as multiple web pages. It is to be appreciated that different due dates and times and content type may be associated with different prices to the customer. Customer prices may also be impacted by other factors that impact the underlying transcription cost, including how objectively difficult the media file transcription is to edit, as described above.

In another example, the customer interface 124 serves media file information that includes final transcription information to the user interface rendered by the client computer 104. This final transcription information includes a final (time-coded or non-time-coded) transcription of the content included in a media file. The time-coded transcription is comprised of a textual representation of the content of the media file, where each textual token has associated with it indicia of the location in the media file to which it applies. The textual tokens may include words, numerics, punctuation, speaker identification, formatting directives, non-verbal indicators (such as [BACKGROUND NOISE], [MUSIC], [LAUGHTER], [PAUSING]) and other markings that may be useful in describing the media file content. The empty string may also be used as a textual token, in which case the location indicia serves to keep the transcription synchronized with the media file content in the absence of useful textual information. In the case of the draft transcription from the ASR device, these empty-string tokens may be used if the ASR process was confident that some transcription-worthy event has occurred at that location, but is unsure of the particular identity of that event. In this case, having the location indicia associated with the event facilitates synchronized correction by the editor.

In other embodiments, the customer interface 124 is configured to receive a request to edit final transcription information from the user interface, and in response to the request, to provide an editing platform, such as the editing screen described below with reference to the editor interface 126, to the user interface. In this example, the editing platform enables customers to edit the final transcription information. Also, in this example, the user interface includes elements that enable the customer 110 to initiate an upload of the edited final transcription information to the customer interface 124. The customer interface 124, in turn, receives the edited final transcription information, stores the final transcription information in the media file storage 136 and stores an association between the edited final transcription information and the media file with content that was transcribed in the market data storage 134.

Although the examples described above focus on a web-based implementation of the customer interface 124, embodiments are not limited to a web-based design. Other technologies, such as technologies employing a specialized, non-browser based client, may be used to implement the user interface without departing from the scope of the aspects and embodiments disclosed herein. For instance, according to one embodiment, the customer interface 124 is a simple, locally executed upload client that allows the customer to do nothing more than upload media files to the server via FTP or some other protocol. In other embodiments, the customer interface 124 is configured to perform a variety of processes in response to exchanging information via the user interface. For instance, in one embodiment, after receiving one or more media files via the user interface, the customer interface 124 provides the market engine 132 with an identifier of newly stored, unprocessed media files.

In some embodiments, the customer interface 124 is configured to provide a system interface to the client computer 104 via the network 116. For instance, in one embodiment, the customer interface 124 implements an HTTP API through which the client computer 104 exchanges transcription request information with the customer interface 124. The transcription request information may include project information (e.g., an identifier of a project), customer information (e.g. an identifier of a customer), media file information (e.g., an identifier of a media file), values of one or more estimated accuracy thresholds, identifiers of one or more requested transcription products, a request for a partial delivery of transcription products associated with the media file, a request for status regarding the generation of the transcription products, a status postback identifier, a delivery point identifier, and responses to any requests. In some embodiments, the status postback identifier and the delivery point identifier may include URI's, URL's, an FTP folder identifier (along with authentication credentials), or the like. In response to receiving the transcription request information, the customer interface 124 may store the transcription request information in the market data storage 134 in association with the identifier of the media file, project, or customer from which the requested transcription products are to be generated. In addition, responsive to receiving the transcription request information, the customer interface 124 may store the media file identified in the transcription request information in the media file storage 136. Transcription request information is described further below with reference to FIG. 2.

Using transcription request information, the client computer 104 may predefine a schedule for the progressive creation and delivery of transcription products. This schedule may apply to a specific media file, all media files associated with a project, or all media files associated with a customer. For example, the client computer 104 may transmit transcription request information requesting that draft transcriptions be transmitted to a customer for all media files provided by the customer. This transcription request information may be received by the customer interface 124 and stored in the market data storage 134 before any of the media files are received. In another example, the client computer 104 may transmit transcription request information requesting that draft transcriptions with quality metrics that exceed an identified threshold be transmitted to the customer. In this case, the transcription request information may further request that the edited transcription not be transmitted, but the QA transcription be transmitted. Other combinations of delivery criteria specifying stage of processing, quality level, receipt of an express delivery request, prior deliveries made (or not made), time since start of media file processing, time until final deadline, time elapsed since prior deliveries made (or requested), estimated time until next stage is complete, estimated time until final transcript is complete, etc. may be used to trigger automated creation and delivery and the embodiments disclosed herein are not limited to a particular combination of delivery criteria. In addition, these delivery criteria may be specified in advance of media file processing, during media file processing, or in response to receiving particular media file processing status information.

In some embodiments, the customer interface 124 is configured to perform a variety of processes in response to exchanging information via the system interface with the client computer 104. For instance, in one embodiment, after receiving transcription request information specifying a request for partial delivery of one or more transcription products, the customer interface 124 provides the request for delivery (or partial delivery) to the market engine 132. In another embodiment, after receiving transcription request information specifying a request for status regarding the generation of the transcription products, the customer interface 124 provides the request for status regarding the generation of the transcription products to the delivery agent 138.

In some embodiments, the administrator interface 130 is configured to provide a user interface to the administrator 114 via the network 120 and the client computer 108. For instance, in one embodiment, the administrator interface 130 is configured to serve a browser-based user interface to the administrator 114 that is rendered by a web-browser running on the client computer 108. In this embodiment, the administrator interface 130 exchanges market information with the administrator 114 via this user interface. Market information may include any information used to maintain the transcription job market and stored within the market data storage 134. Specific examples of market information include a media file information, job information, customer information, editor information, administrator information and transcription request information. Market information is described further below with reference to FIG. 2. Using the administrator interface 130, the administrator 114 acts as a transcription manager who regulates the transcription job market as a whole to promote its efficient allocation of resources.

In these embodiments, the administrator interface 130 is also configured to receive a request from the user interface to provide a preview of a media file, and in response to the request, serve a preview screen for the requested media file to the user interface. This preview screen provides the content of the media file and the draft transcription associated with the media file. More particular, in some embodiments, the preview screen is configured to provide the media file content, in the form of, for example, a streamed version of the original file, as well as the draft transcription information for the media file, which includes time-codes. This information enables the preview screen to display the draft transcription in synchronization with the media file content. A preview may consist of all or some of this information.

According to an example illustrated by FIG. 1, the administrator interface 130 provides media file information to the user interface. This media file information includes one or more unique identifiers of one or more media files previously received from the customer 110, the content types associated with the received media files and the difficulties associated with the received media files. In this example, responsive to receipt of an indication that the administrator 114 wishes to preview a media file, the administrator interface 130 provides a preview of the media file and the draft transcription information associated with the media file. Further, in this example, the administrator interface 130 receives modifications to the provided media file information made by the administrator 114 via the user interface. Responsive to receiving the modifications, the administrator interface 130 stores the modifications in the market data storage 134.

In other embodiments, the administrator interface 130 is also configured to receive a request from the user interface to provide an administrator view of all jobs available on the market, and in response to the request, serve an administrator screen to the user interface. This administrator view is configured to display the same information available to editors viewing the job market (difficulty, pay-rate, due date and time, domain, etc.), and also displays additional information to assist the administrator. For example, the administrator view may display the number of editors with permission to edit each available media file, the amount of time each job has been on the market, the number of previews of the media file, and other data concerning the market status of the media file. In this way, the administrator view displays information that enables administrators to ensure that the media file is accepted as an editing job.

The administrator interface 130 is also configured receive a request from the user interface to modify information displayed by administrator view, and in response to the request, store the modified information. Thus, the administrator view may increase the pay rate, may manually enable a larger number (or smaller number) of editors access to the file, or may cut the file into shorter segments—thus producing several editing jobs for the same media file. The administrator view may also bundle jobs together to ensure that all editors have access to a reasonable cross-section of work. For example, the administrator view may group a selection of jobs with variable difficulty together so that a single editor would need to accept all of these jobs, instead of just picking low difficulty jobs for themselves. The administrator view may also throttle the supply of low difficulty jobs in order to create a more competitive environment or to induce editors to work on difficult jobs. The administrator view may also record as accepted a claim offer that is higher than the pay rate for a job.

In other embodiments, the administrator interface 130 is also configured to receive a request from the user interface to provide a meta rules view, and in response to the request, serve a meta rules screen to the user interface. Meta rules globally modify the behavior of the market by affecting how all or some of the available jobs will appear on the market. In some embodiments, the administrator interface 130 is configured receive a request from the user interface to add to or modify meta rules displayed by meta rules view, and in response to the request, store the newly introduced meta rule information.

In other embodiments, the administrator interface 130 is also configured to receive a request from the user interface to provide a market view of jobs available on the market, and in response to the request, serve a market screen to the user interface. The market screen is configured to provide summarized information about jobs organized according to one or more job (or associated media file) attributes. For instance, one example of the market screen displays all of the jobs assigned to one or more editors. In another example, the market screen displays all jobs organized by due date and time in the form of a calendar. In yet another example, the market screen displays all jobs belonging to a particular customer.

Although the examples described above focus on a web-based implementation of the administrator interface 130, embodiments are not limited to a web-based design. Other technologies, such as technologies employing a specialized, non-browser based client, may be used without departing from the scope of the aspects and embodiments disclosed herein.

In some embodiments, the editor interface 126 is configured to provide a user interface to the editor 112 via the network 118 and the client computer 106. For instance, in one embodiment, the editor interface 126 is configured to serve a browser-based user interface to the editor 112 that is rendered by a web-browser running on the client computer 106. In this embodiment, the editor interface 126 exchanges media file information, editor information and job information with the editor 112 via this user interface. Editor information may include information associated with an editor profile or the history of an editor within the transcription job market. Job information may include information associated with transcription jobs that are available or that have been completed via the transcription job market. Specific examples of editor information include a unique identifier of the editor, domains of subject matter in which the editor is qualified to work, and identifiers of currently claimed jobs. Specific examples of job information include a unique identifier of the job, a deadline for the job, and a pay rate for the job. Media file information, editor information and job information are described further below with reference to FIG. 2.

In these embodiments, the editor interface 126 is configured to provide job information only for jobs that the editor 112 is permitted to work. In one example, the editor interface 126 determines that an editor is permitted to edit a draft transcription based on a complex of factors. If a media file associated with the draft transcription has a specific content type, then in some examples, the editor interface 126 will only provide job information associated with the media file to editors qualified to edit that specific content type. In other examples, the editor interface 126 may provide job information associated with more difficult files to more experienced editors. In still other examples, the editor interface 126 provides job information for jobs associated with specific customers to particular subset of editors. This approach may be advantageous, for example, if there are confidentiality concerns and only that subset of editors have signed non-disclosure agreements. Thus, examples of the editor interface 126 do not provide job information to the editor 112 for jobs claimed by another editor or for jobs that the editor 112 does not have permission to claim.

In other embodiments, the editor interface 126 is configured to receive a request from the user interface to provide a preview of a media file, and in response to the request, serve a preview screen for the requested media file to the user interface. This preview screen provides the content of the media file and the draft transcription information associated with the media file. Editors may be given access to the preview screen for a media file before they choose to accept the editing job at the given pay rate. The preview screen includes the media file content, in the form of, for example, a streamed version of the original media file, as well as the draft transcription information for the media file, which includes time-codes. This information enables the preview screen to display and draft transcription in synchronization with playback of the media file content. A preview may consist of all or some of this content. The editors may access the preview screen content and thereby assess for themselves the difficulty of the editing job, and then make a judgment as to whether they are willing to accept the job at the current pay rate. This enables editors to select content that they are interested in and to reveal their expertise or preferences for subject matter that would otherwise by unknown to administrators. In aggregate this will tend to improve transcription quality since the jobs will be better matched to editors than if randomly assigned.

According to an example illustrated by FIG. 1, the editor interface 126 provides job information to the user interface. This job information includes one or more unique identifiers of one or more jobs available for the editor 112, identifiers of the media files associated with the jobs, pay rates of the jobs, domain information, and durations of the content of the media file associated with the job. In this example, responsive to receipt of an indication that the editor 112 wishes to preview a media file, the editor interface 126 provides a preview of the media file and the draft transcription information associated with the media file. If the editor 112 wishes to claim the job, the editor 112 indicates this intent by interacting with the user interface and the user interface transmits a request to claim the job for the editor 112 to the editor interface 126. Next, in this example, the editor interface 126 receives the request to claim an available job from the user interface, and responsive to receiving this request, the editor interface 126 records the job as claimed in the market data storage 134.

In other embodiments, the editor interface 126 is configured to receive a request from the user interface to edit a draft transcription, and in response to the request, serve an editing screen to the user interface. The editing screen is configured to provide a variety of tools for editing and correcting the draft transcription. For instance, the editing screen provides access to the original file (or a converted version of the original file) along with the draft transcription information by referencing information contained in both the market data storage 134 and the media file storage 136.

In one embodiment, once an editor begins working on a job, the editing screen provides the complete media file content and time-coded draft transcription information for editing using client-computer-based editing software. The editor interface 126 also transitions the job into a working state by recording the working state for the job in the market data storage 134.

The editing process consists of playing the media file content, and following along with the draft transcription, modifying the draft transcription information as necessary to ensure that the saved draft transcription reflects the content of the media file. According to some embodiments, as the editor modifies the draft transcription information, the editing screen communicates with the editor interface 126 to indicate progress through the editing job. The editing screen tracks the time point into the file that the editor is playing, as well as the parts of the draft transcription information that has been modified in order to estimate progress. The progress is communicated back to the editor interface 126, and the editor interface 126 then stores this progress in the market data storage 134 in association with the editing job. In the course of editing a job, the editor may come across words or phrases that are difficult to understand. The editing screen allows editors to flag these regions, so that they may be reviewed and possibly corrected by an administrator. A flag may indicate complete unintelligibility or may include a guess as to the correct word, but with an indicator that it is a guess. For each job, the prevalence of corrected flags in the edited transcript is stored in the market data storage 134, and the market engine 132 may use stored flags as an indicator of editor proficiency to aid with future job assignment. In some embodiments, the editing screen allows editors to store auxiliary deliverables such as search keywords, descriptive summarization, and other metadata derived from the transcription information during editing jobs and QA jobs.

In other embodiments, the editor interface 126 is configured to receive a request from the user interface to save an edited draft transcription, and in response to the request, save the edited draft transcription to the media file storage 136 and update progress information for the job in the market data storage 134. In some embodiments, saving the progress information triggers estimation of a new completion date and time, which is then evaluated relative to the due date and time as discussed with reference to FIG. 6 below.

According to an example illustrated by FIG. 1, the editor interface 126 provides job information to the user interface. This job information includes one or more unique identifiers of one or more jobs available for the editor 112, identifiers of the media files associated with the jobs, pay rates of the jobs, durations of the content of the media file associated with the job and progress the editor 112 has made editing the draft transcription associated with the job. In this example, responsive to receipt of an indication that the editor 112 wishes to edit the draft transcription, the editor interface 126 serves an editing screen to the user interface.

In some embodiments, the editing screen is configured to receive an indication that the editor has completed a job. In these embodiments, the editing screen is also configured to, in response to receiving the indication, store the edited draft transcription information as final transcription information in the media file storage 136 and update the market data storage 134 to include an association between the media file and the final transcription information.

The examples described above focus on a web-based implementation of the editor interface 126. However, embodiments are not limited to a web-based design. Other technologies, such as technologies employing a specialized, non-browser based client, may be used without departing from the scope of the aspects and embodiments disclosed herein.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the transcription system 100 or unauthorized access to the transcription system 100.

Figure 2:
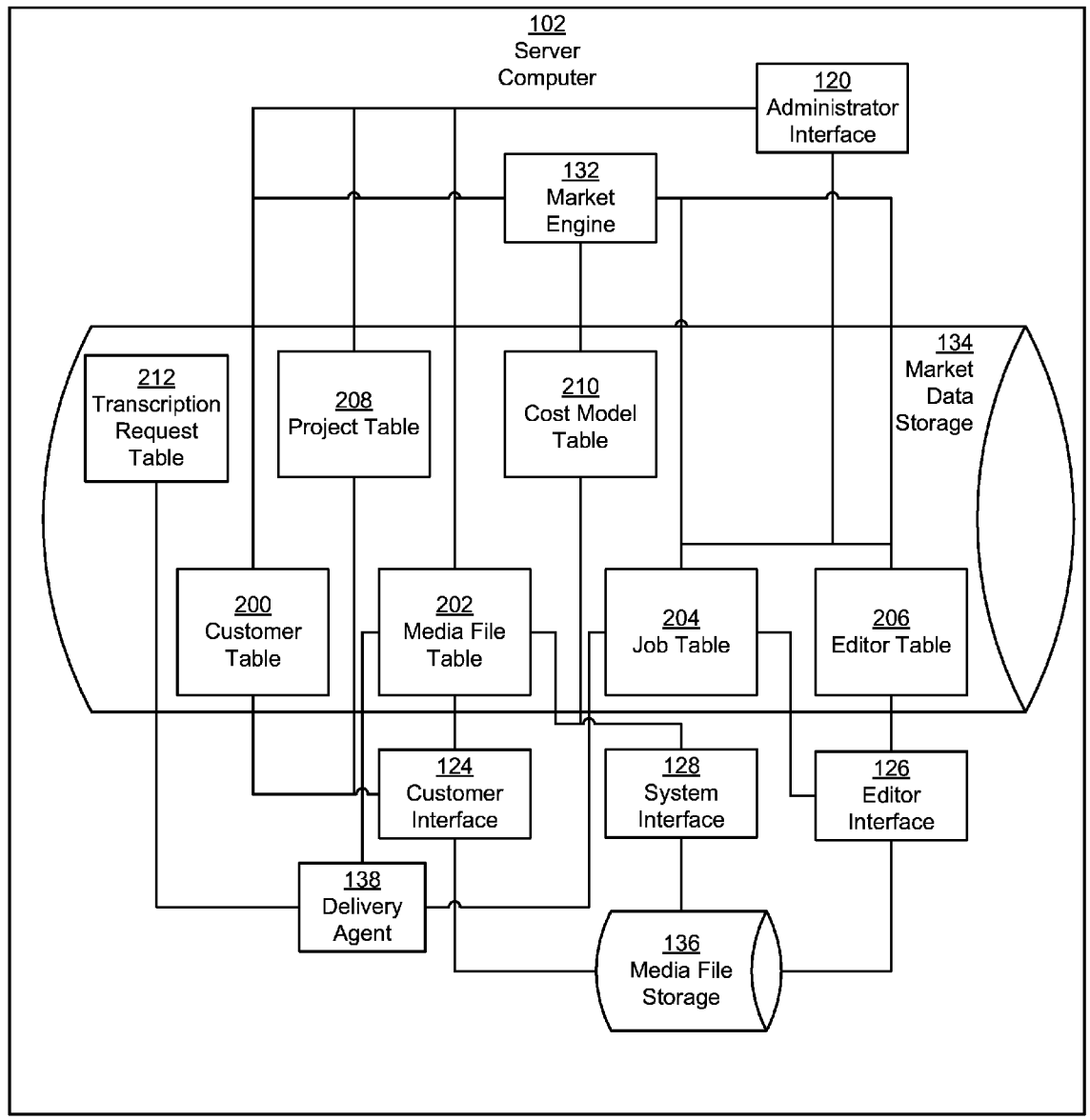
FIG. 2 is a schematic diagram of the server computer shown in FIG. 1.

FIG. 2 illustrates the server computer 102 of FIG. 1 in greater detail. As shown in FIG. 2, the server computer 102 includes the market engine 132, the market data storage 134, the customer interface 124, the system interface 128, the editor interface 126, the media file storage 136 and the delivery agent 138. In the embodiment illustrated in FIG. 2, the market data storage 134 includes a customer table 200, a media file table 202, a job table 204, an editor table 206, a project table 208 and a cost model table 210.

In the embodiment of FIG. 2, the customer table 200 stores information descriptive of the customers who employ the transcription job market to have their media files transcribed. In at least one embodiment, each row of the customer table 200 stores information for a customer and includes an customer_id field, and a customer_name field. The customer_id field stores an identifier of the customer that is unique within the transcription job market. The customer_name field stores information that represents the customer's name within the transcription job market. The customer_id is used as a key by a variety of functions disclosed herein to identify information belonging to a particular customer.

The media file table 202 stores information descriptive of the media files that have been uploaded to the transcription job market for transcription. In at least one embodiment, each row of the media file table 202 stores information for one media file and includes the following fields: file_id, customer_id, state, duration, due_date_and_time, difficulty, domain, ASR_cost, proposed_pay_rate, ASR_transcript_location, edited_transcript_location, QA_transcript_location, transcript_product1, transcript_product 2, etc. . . . The file_id field stores a unique identifier of the media. The customer_id field stores a unique identifier of the customer who provided the media file. The state field stores information that represents the state of the media file. The duration field stores information that represents the duration of the content of the media file. The due_date_and_time field stores information that represents the date and time by which the customer requires a transcription be complete. The difficulty field stores information that represents an assessed difficulty of completing a transcription of the media file. The domain field stores information that identifies a subject matter domain to which the media file belongs. The ASR_cost field stores information that represents a predicted cost of transcribing the media file as assessed using draft transcription information. The proposed_pay_rate field stores information that represents a pay rate proposed using draft transcription information. The ASR_transcript_location field stores an identifier of a location of draft transcript information associated with the media file. The edited_transcript_location field stores an identifier of a location of edited draft transcript information associated with the media file. The QA_transcript_location field stores an identifier of a location of QA transcription information associated with the media file. The transcript_product1, transcript_product2, etc. . . . store identifiers of locations of other transcription products associated with the media file. The file_id is used as a key by a variety of functions disclosed herein to identify information associated with a particular media file.

The job table 204 stores information descriptive of the jobs to be completed within the transcription job market. In at least one embodiment, each row of the job table 204 stores information for one job and includes the following fields: job_id, file_id, deadline, state, job_type, pay_rate, editor_id, progress, flags, XRT, corrections, hide, ASR_distance. The job_id field stores an identifier of the job that is unique within the transcription job market. The file_id field stores the unique identifier of the media file to be transcribed by an editor working the job. The deadline field stores information that represents the date and time by which the job must be complete. The state field store the current state (or status) of the job. Examples values for the state field include New, ASR_In_Progress, Available, Assigned, Editing_In_Progress, and Complete. The job_type field stores information that represents a type of work that must be performed to complete the job, for example editing, QA, etc. The pay_rate field stores information that represents a pay rate for completing the job. The editor_id field stores the unique identifier of the editor who has claimed this job. The progress field stores information that represents an amount of work completed for the job. The flags field stores information that represents the number and type of flags assigned to the job during editing, as described above. The XRT field stores information that represents the times-real-time statistic applicable to the job. The corrections field stores information that represents corrections made to the draft transcription as part of the job. The hide field stores information that determines whether components, such as the market engine 132 and the editor interface 126, should filter out the job from job views. The ASR_distance field stores information that represents the number of changes from the draft transcription made as part of the job. The job_id is used as a key by a variety of functions disclosed herein to identify information associated with a particular job.

The editors table 206 stores information descriptive of the editors who prepare transcriptions within the transcription job market. In at least one embodiment, each row of the editors table 206 stores information for one editor and includes the following fields: editor_id, roles, reward_points, domains, and special_capabilities. The editor_id field stores an identifier of the editor that is unique within the transcription job market. The roles field stores information representative of roles that the editor is able to assume with the transcription job market, for example, editor, QA, etc. Examples of these roles include editor and QA editor. The reward_points field stores information that represent the number of reward points accumulated by the editor. The domains field stores information that represents subject matter domains of media files that the editor has permission to edit. The special_capabilities field stores information that represents specialized skills that the editor possesses. The editor_id is used as a key by a variety of functions disclosed herein to identify information belonging to a particular editor.

In the embodiment of FIG. 2, the project table 208 stores information descriptive of projects that the transcription job market is being utilized to complete. In at least one embodiment, each row of the project table 208 stores information for a project and includes an project_id field, a project_name field, a customer_id field, and a domain field. The project_id field stores information that identifies a group of media files that belong to a project. The project_name field stores information that represents the project's name within the transcription job market. The customer_id field indicates the customer to whom the project belongs. The domain field stores information that identifies a subject matter domain of media files included in the project. The project_id is used as a key by a variety of functions disclosed herein to identify information grouped into a particular project.

In the embodiment of FIG. 2, the cost model table 210 stores information descriptive of one or more cost models used to predict the cost of editing the content included media files. In at least one embodiment, each row of the cost model table 210 stores information representative of a cost model and includes an editor_id field, a customer_id field, a project_id field and a Cost_Model_Location field. The editor_id field stores the unique identifier of an editor to whom the cost model applies. The customer_id field stores the unique identifier of a customer to whom the cost model applies. The project_id field stores the unique identifier of a project to which the cost model applies. The Cost_Model_Location field stores information identifying a location of the cost model. The editor_id, customer_id or project_id, any of which may be null or the wildcard indicator, may be used as a key by a variety of functions disclosed herein to identify a location of a cost model applicable to any of these entities.

The transcription request table 212 stores information descriptive of requests for delivery of transcription products. In at least one embodiment, each row of the transcription request table 212 stores information for one transcription request and includes the following fields: file_id, project_id, customer_id, status_postback, delivery_point, transcription_product, and quality_thresholds. The file_id field stores a unique identifier of a media file that is the basis for the requested transcription products. The customer_id field stores a unique identifier of the customer who provided the transcription request. The status_postback field stores an identifier of a location to which status information may be transmitted. The delivery_point field stores an identifier of a location to which the requested transcription products may be transmitted. The transcription_product field stores identifiers of the requested transcription products. The quality_thresholds field stores values of one or more quality thresholds associated with one or more potential delivery types. The delivery types may be defined by points in time or transcription status.

Various embodiments implement the components illustrated in FIG. 2 using a variety of specialized functions. For instance, according to some embodiments, the customer interface 124 uses a File_Upload function and a File_Update function. The File_Upload function uploads a file stored on a customer's computer to the server computer 102 and accepts parameters including customer_id, project_id, filename, and optionally, domain. The customer_id parameter identifies the customer's unique customer_id. The project_id identifies the project to which the media file belongs. The filename parameter specifies the name of the media file to be uploaded by the customer interface 124. The domain parameter specifies the subject matter domain to which the media file belongs. In at least one embodiment, if the domain parameter is not specified, the market engine 132 determines the value of the domain parameter from the value of the domain field of a record stored within the project table 208 that has a project_id field that is equal to the project_id parameter.

In other embodiments, the File_Update function updates an attribute of a media file record and accepts parameters including file_id, attribute, and value. The file_id parameter identifies the media file record with attributes that will be modified as a result of execution of the File_Update function. The attribute parameter identifies an attribute to be modified. In at least one embodiment, this attribute may be the domain, difficulty or state of the media file, as stored in the media file table 202. The value parameter specifies the value to which the attribute is to be set as a result of executing the File_Update function.

In other embodiments, the system interface 128 uses a File_Send_to_ASR function and a File_Create_Draft function. The File_Send_to_ASR function provides a media file to the ASR device 122 and causes the ASR device 122 to perform automatic speech recognition on the content included in the media file. The File_Send_to_ASR function accepts parameters including file_id. The file_id parameter identifies the media file to be processed by the ASR device 122.

In other embodiments, the File_Create_Draft function creates draft transcription information for a media file and accepts parameters including file_id and ASR_output. The file_id parameter identifies the media file for which the draft transcription information will be created by execution of the File_Create_Draft function. The ASR_output parameter specifies the location of the ASR output generated by the ASR device 122 during its processing of the media file.

In other embodiments, the market engine 132 uses the following functions: File_Assess_Difficulty, File_Propose_Pay_Rate, File_Compute_Actual_Difficulty, Job_Create, Job_Split, Job_Adjust_Parameter and Job_Revoke. The File_Assess_Difficulty function determines an estimated difficulty to transcribe the content included in a media file and accepts parameters including a file_id. The file_id parameter identifies the media file including the content for which difficulty is being accessed.

In other embodiments, the File_Propose_Pay_Rate function determines an initial pay rate for transcribing the content included in a media file and accepts parameters including file_id and draft_transcription_information. The file_id parameter identifies the media file for which the proposed_pay_rate that will be determined as a result of execution of the File_Propose_Pay_Rate function. The draft_transcription_information parameter specifies the location of the draft transcription information associated with the media file. The File_Propose_Pay_Rate function determines the initial pay rate using the information included in the draft transcription information.

In other embodiments, the File_Compute_Actual_Difficulty function determines an actual difficulty of transcribing the content included in a media file and accepts parameters including file_id (from which it determines the location of the draft_transcription_information and final_transcription_information from the media file table 202. The file_id parameter identifies the media file for which the actual difficulty will be determined as a result of execution of the File_Compute_Actual_Difficulty function. The File_Compute_Actual_Difficulty function determines the actual difficulty by comparing the content of the draft transcription included in the draft transcription information to the content of the final transcription included in the final transcription information. In one embodiment, File_Compute_Actual_Difficulty function uses the number of corrections performed on the transcription to compute a standard distance metric, such as the Levenshtein distance. The File_Compute_Actual_Difficulty function stores this measurement in the ASR_distance field of the job table 204.

In other embodiments, the Job_Create function creates a job record and stores the job record in the job table 204. The Job_Create function and accepts parameters including file_id, job_type, pay_rate and, optionally, deadline. The file_id parameter identifies the media file for which the job is being created. The job_type parameter specifies the type of editing work to be performed by an editor claiming the job. The pay_rate parameter specifies the amount of pay an editor completing the job will earn. The deadline parameter specifies the due date and time for completing the job.

In other embodiments, the Job_Split function segments a job into multiple jobs and accepts parameters including job_id and a list of timestamps. The job_id parameter identifies the job to be segmented into multiple jobs. The list of timestamps indicates the location in the media file at which to segment the media file to create new jobs.

In other embodiments, the Job_Adjust_Attribute function modifies the value of an attribute stored in a job record and accepts parameters including job_id, attribute and value. The job_id parameter identifies the job record with an attribute to be modified. The attribute parameter identifies an attribute to be modified. In at least one embodiment, this attribute may be the pay_rate, deadline, XRT, or ASR_distance of the job record, as stored in the job table 204. The value parameter specifies the value to which the attribute is to be set as a result of executing the Job_Adjust_Attribute function.

In other embodiments, the Job_Revoke function removes a job from an editor and makes the job available for other editors to claim according to the current market rules. The Job_Revoke function accepts parameters including job_id. The job_id parameter identifies the job to be revoked.

In other embodiments, the delivery agent 138 uses the Derive_Product function and the Deliver_Product function. The Derive_Product function derives one or more transcription products from transcription information and accepts parameters including transcription_product and transcription_information. The transcription_product parameter identifies a transcription product to be derived from transcription information specified by the transcription_information parameter. For example, the transcription_product parameter may specify a transcription, a transcription with all flags converted to "[INAUDIBLE]," captions, a binary encoded caption format such as SCC format, a media file with embedded captions, descriptive summaries, keywords, and the like. The transcription_information parameter specifies the location of the transcription information from which the transcription product will be derived. For example, the transcription_information parameter may specify a location of draft (ASR) transcription information, edited transcription information, or QA transcription information. The transcription product may be stored in the media file storage 136 at a location specified by a product_id.

In other embodiments, the Deliver_Product function transmits one or more transcription products to a delivery point via the customer interface 124 and accepts parameters including a product_id, and delivery_point. The product_id parameter identifies the transcription product to be delivered to the location identified by the delivery_point parameter.

In other embodiments, the editor interface 126 uses the following functions: Job_Store_Output, Job_Update_Progress, Job_List_Available, Job_Preview, Job_Claim, and Job_Begin. The Job_Store_Output function stores the current version of the edited draft transcription and accepts parameters including a job_id. The job_id parameter identifies the job for which the current version of the edited draft transcription is being stored.

In other embodiments, the Job_Update_Progress function updates the progress attribute included in a job record and saves the current state of the transcription. The Job_Update_Progress function accepts parameters including job_id, transcription data and progress. The job_id parameter identifies the job record for which the progress attribute will be updated to the value specified by the progress parameter. The transcription data is saved to the location specified in the media file record associated with the job_id.

In other embodiments, the Job_List_Available function returns a list of jobs available to an editor and accepts parameters including editor_id, and optionally, job_type, domain, difficulty, deadline, and proposed_pay_rate. The editor_id parameter identifies the editor for which the list of available jobs is being created. The job_type parameter specifies a job_type to which each job in the list of available jobs must belong. The domain parameter specifies a domain to which each job in the list of available jobs must belong. The difficulty parameter specifies a difficulty that the media file associated with the job in the list must have. The deadline parameter specifies a deadline that each job in the list of available jobs must have. The proposed_pay_rate parameter specifies a proposed_pay_rate that the media file associated with the job must have. It is to be appreciated that meta rules, may also impact the list of jobs returned by the Job_List_Available function.

In other embodiments, the Job_Preview function causes a preview screen to be provided to a user interface and accepts parameters including editor_id and job_id. The editor_id parameter identifies the editor for which the preview is being provided. The job_id parameter specifies the job that is being previewed.

In other embodiments, the Job_Claim function records a job as claimed and accepts parameters including editor_id and job_id. The editor_id parameter identifies the editor for which the job is being claimed. The job_id parameter specifies the job that is being claimed.

In other embodiments, the Job_Begin function causes an editing screen to be provided to a user interface and accepts parameters including job_id. The job_id parameter specifies the job associated with the draft transcription to be edited.

Embodiments of the transcription system 100 are not limited to the particular configuration illustrated in FIGS. 1 and 2. Various examples utilize a variety of hardware components, software components and combinations of hardware and software components configured to perform the processes and functions described herein. In some examples, the transcription system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system.

Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
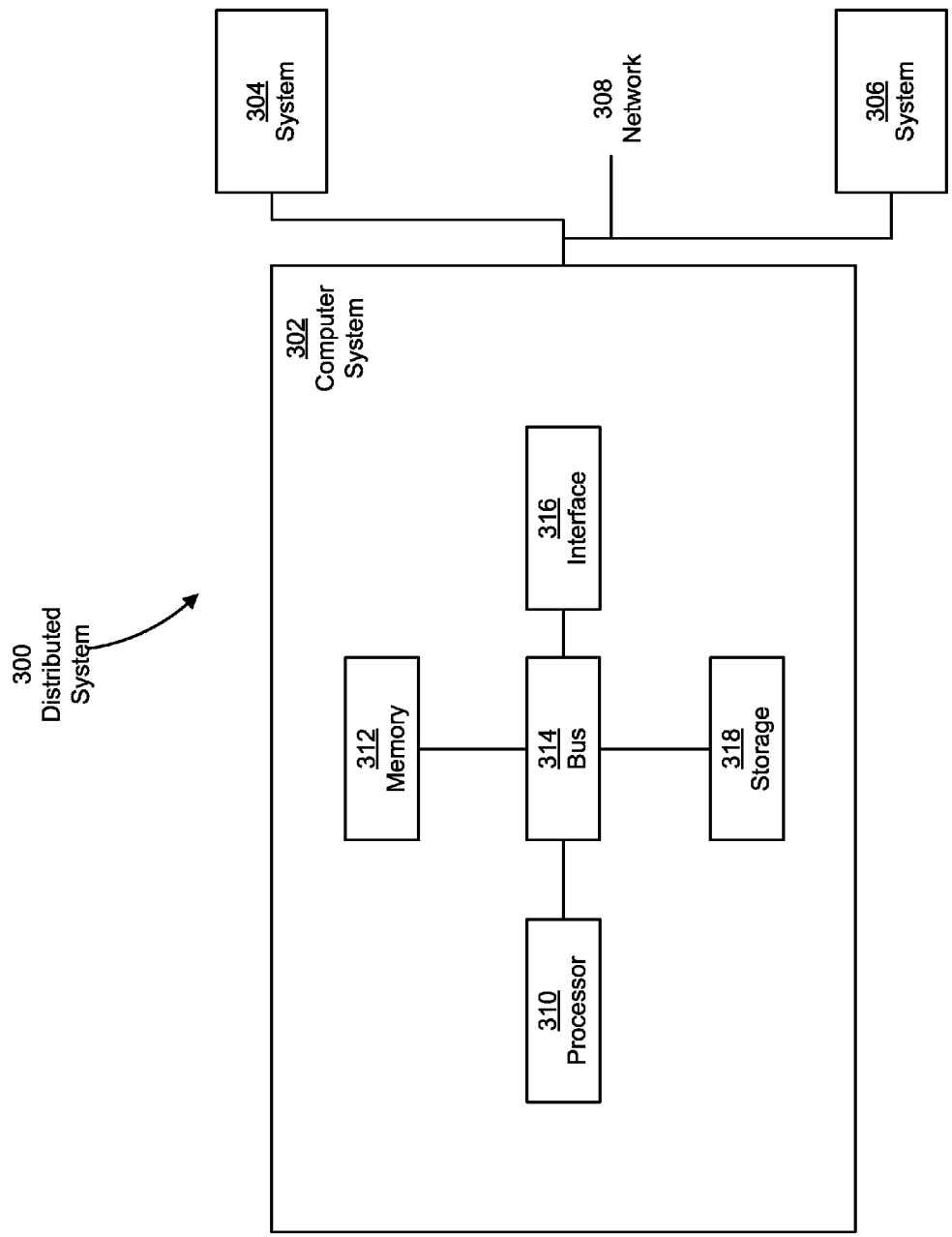
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Transcription System Processes

Figure 4:
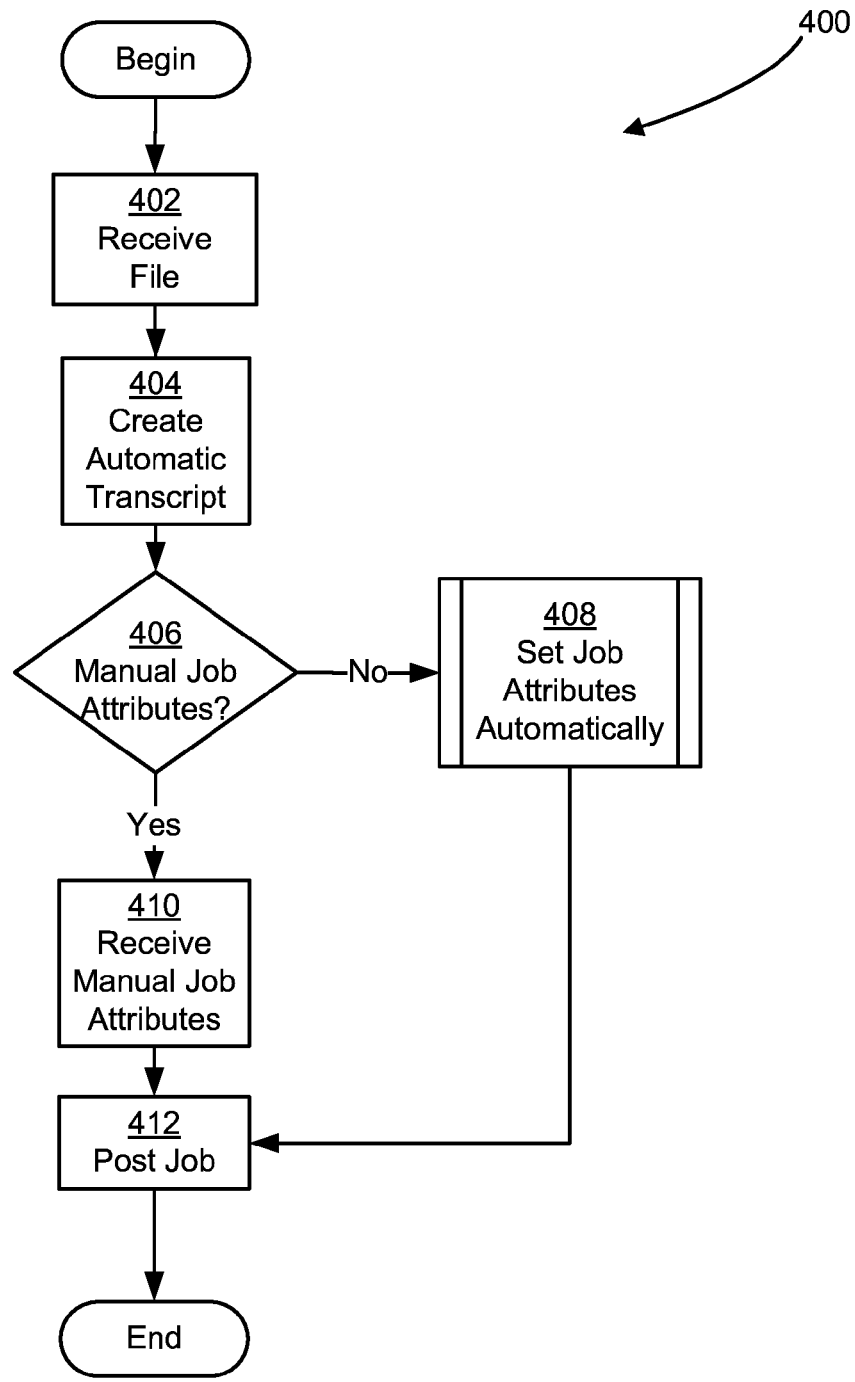
FIG. 4 is a flow diagram illustrating a process for creating a transcription job.

Some embodiments perform processes that add jobs to a transcription job market using a transcription system, such as the transcription system 100 described above. One example of such a process is illustrated in FIG. 4. According to this example, a process 400 includes acts of receiving a media file, creating an ASR transcription, receiving job attributes, setting job attributes automatically and posting a job.

In act 402, the transcription system receives a media file including content to be transcribed. Next, in act 404, the transcription system uses an ASR device to produce an automatic transcription and associated information. After the automatic transcription is created, the transcription system optionally delivers the automatic transcription to the customer and determines whether attributes for a job to be associated with the media file will be set manually in act 406. If so, the transcription system receives the manually entered job attributes in act 410. Otherwise, the transcription system executes a process that sets the job attributes automatically in act 408. This process is described further below with reference to FIG. 7. Once the job attributes have been set, the transcription system posts the job in act 412, and the process 400 ends.

Figure 5:
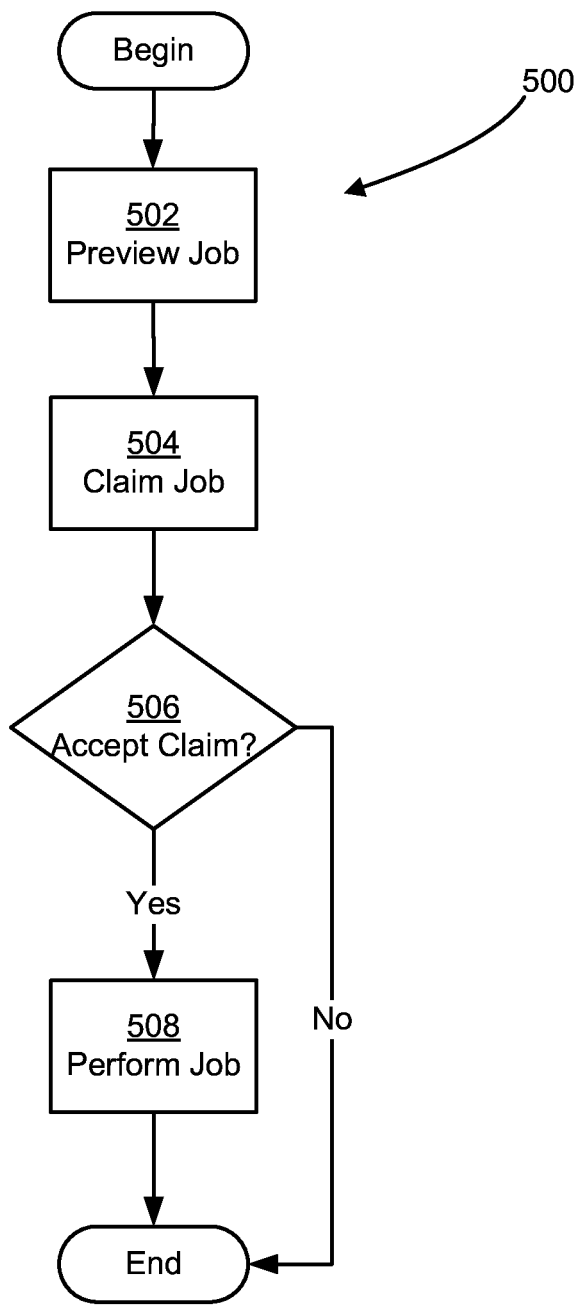
FIG. 5 is a flow diagram illustrating a process for editing a transcription job.

Other embodiments perform processes that allow and editor to perform a job listed on the transcription job market using a transcription system, such as the transcription system 100 described above. One example of such a process is illustrated in FIG. 5. According to this example, a process 500 includes acts of previewing a job, claiming a job and completing a job.

In act 502, the transcription system receives a request to provide a preview of a job. In response to this request, the transcription system provides a preview of the job. The preview includes a preview of the content included in the media file associated with the job and draft transcription information for an ASR generated transcription that is associated with the media file. The preview may also include job attributes such as pay rate, domain, duration, and difficulty.

Next, in act 504, the transcription system receives a request to claim the job. In response to this request, the transcription system determines whether to accept the claim using the processes disclosed herein. If the claim is not accepted, the process 500 ends. If the claim is accepted, the process 500 executes act 508.

In the act 508, the transcription system receives a request to perform the job. In response to this request, the transcription system provides a user interface and tools that enable an editor to perform work. While the editor is performing the work, the transcription system monitors progress and periodically saves work in process. Upon receipt of an indication that the editor has completed the job, the transcription system saves the completed job, and the process 500 ends.

Figure 6:
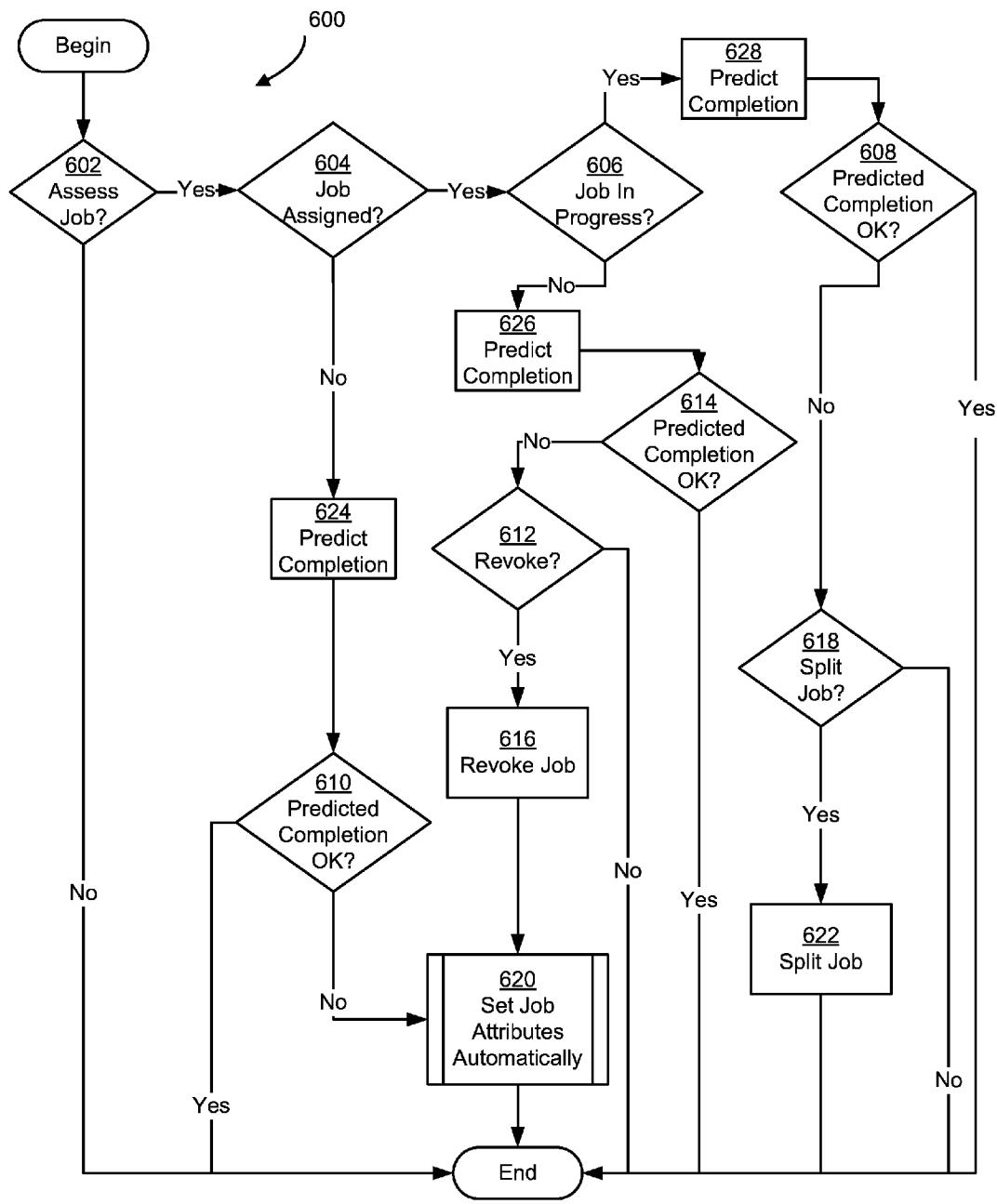
FIG. 6 is a flow diagram illustrating a process for calibrating a job.

Other embodiments perform processes that monitor jobs to ensure the jobs are completed according to schedule using a transcription system, such as the transcription system 100 described above. One example of such a process is illustrated in FIG. 6. According to this example, a process 600 includes several acts that are described further below.

In act 602, the transcription system determines whether a job should be assessed for attribute adjustment. The transcription system may make this determination based on a variety of factors including receipt of a request to assess the job from a component of the system or an entity external to the system (e.g., a request for immediate delivery of the job's output) or expiration of a predetermined period of time since the job was previously assessed, i.e., a wait time. If the job should not be assessed, the process 600 ends. Otherwise, the process 600 executes act 604.

In the act 604, the transcription system determines whether the job is assigned. If so, the transcription system executes act 624. Otherwise, the transcription system determines whether the job is in progress in act 606. If not, the transcription system executes act 626. Otherwise, the transcription system executes the act 628.

In the acts 624, 626 and 628, the transcription system predicts the completion date and time of the job using one or more of the following factors: the current date and time, the amount of progress already complete for the job; historical productivity of the editor (in general or, more specifically, when editing media files having a characteristic in common with the media file associated with the job); the number of jobs currently claimed by the editor; the number of jobs the editor has in progress; and the due dates and times of the jobs claimed by the editor.

In some embodiments, the following equation is used to predict the completion date and time of the job:

$$Tc=To+[1-Pj)*Dj*Xe]+[K1*Fc*Dc*Xc]+[K2*Fp*Dp*Xp]$$

Where,

Tc is the predicted completion time of the job

To is the current time

Pj is the progress on the job, expressed as a decimal fraction

Xe is the times-real-time-statistic for the editor, either the general statistic or the conditional statistic as determined by the job characteristics Xc is the times-real-time-statistic for the editor, either the general statistic or the conditional statistic as determined by the claimed job characteristics, taken as a whole Xp is the times-real-time-statistic for the editor, either the general statistic or the conditional statistic as determined by the in-progress job characteristics, taken as a whole Dj is the duration of the job Dc is the duration of the claimed but not yet in-progress jobs Dp is the duration of the in-progress jobs Fc is the fraction of the total claimed job duration accounted for by jobs which have a due date and time earlier than that of the current job Fp is the fraction of the total in-progress jobs duration accounted for by jobs which have a due date and time earlier than the current job K1 and K2 are tunable constants In act 608, the transcription system determines whether the predicted completion date and time of the job is before the due date and time of the job. If so, the process 600 ends. Otherwise, the transcription system executes act 618.

In act 610, the transcription system determines whether the predicted completion date and time of the job is before the due date and time of the job. If so, the process 600 ends. Otherwise, the transcription system executes a process that sets the job attributes automatically in act 620. This process is described further below with reference to FIG. 7. Once the job attributes have been set, the process 600 ends.

In act 614, the transcription system determines whether the predicted completion date and time of the job is before the due date and time of the job. If so, the process 600 ends. Otherwise, the transcription system determines whether to revoke the job in act 612. If not, the process 600 ends. Otherwise, the transcription system revokes the job in act 616.

In act 618, the transcription system determines whether to split the job. If not, the process 600 ends. Otherwise, the transcription system splits the job in act 622, and the process 600 ends.

Figure 7:
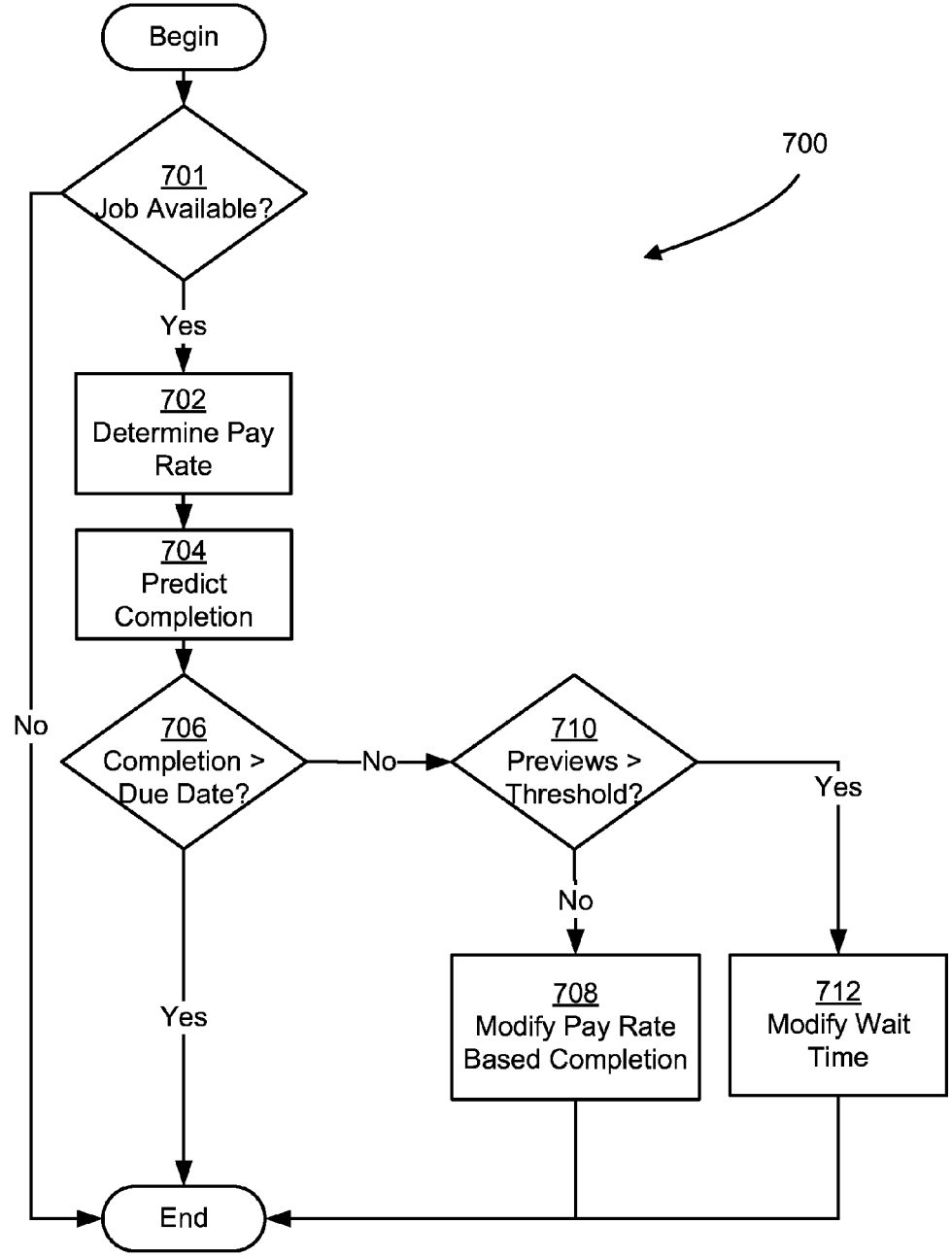
FIG. 7 is a flow diagram illustrating a process for determining transcription job attributes.

As discussed above with reference to FIGS. 4 and 6, some embodiments perform processes that set attributes of jobs using a transcription system, such as the transcription system 100 described above. One example of such a process is illustrated in FIG. 7. According to this example, a process 700 includes several acts that are described further below.

In act 701, the transcription system determines if the job is available. In not, the process 700 ends. Otherwise, the transcription system determines a pay rate for the job in act 702. The transcription system may make this determination based on any of a variety of factors including due date and time, difficulty, domain and ASR_cost.

In act 704, the transcription system predicts a completion date and time for the job for each editor. The transcription system may make this determination based on any of a variety of factors including difficulty, domain and historical XRT of previously completed, similar jobs.

In act 706, the transcription system determines whether the completion date and time is prior to the due date and time for the job. If so, the process 700 ends. Otherwise, the transcription system determines whether the number of previews provided for the job transgresses a threshold in act 710. If not, the transcription system executes act 708. Otherwise, the transcription system executes act 712.

In act 708, the transcription system modifies the pay rate based on the difference between the due date and time to the completion date and time, and the process 700 ends. For instance, the transcription system may set the modified pay rate equal to the unmodified pay rate plus a date and time increment amount multiplied by the difference between the due date and time and the completion date and time.

In act 712, the transcription system modifies the wait time for reassessment of the job, and the process 700 ends. For instance, the transcription system may set the modified wait time equal to the unmodified wait time plus an increment amount.

Figure 9:
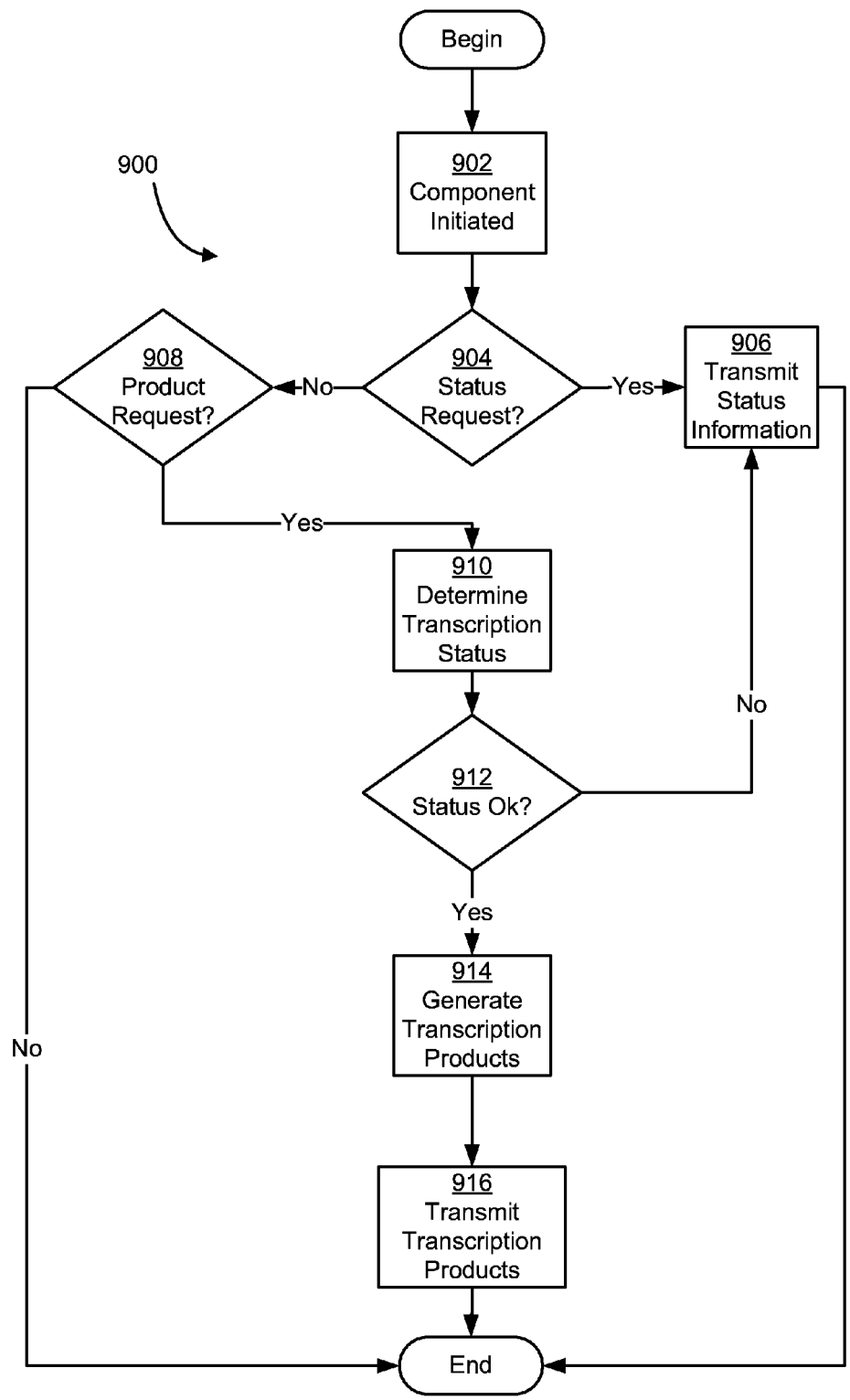
FIG. 9 is a flow diagram illustrating a process for progressively delivering transcription products.

Other embodiments perform processes that progressively deliver transcription products to customers using a transcription system, such as the transcription system 100 described above. One example of such a process is illustrated in FIG. 9. According to this example, a process 900 includes several acts described further below.

In act 902, a delivery agent, such as the delivery agent 138 described above with reference to FIG. 1, receives a notification. This notification may be generated by the transcription system from a previously configured schedule or may be received from another component of the transcription system, such as the customer interface 124 or the market engine 132, both of which are described above with reference to FIG. 1. The notification may include transcription request information. For example, the notification may include a request for status from an external system, such as the client computer 104 described above with reference to FIG. 1. Alternatively, the notification may include status and location information for one or more transcriptions.

In act 904, the delivery agent parses the notification to determine whether the notification is a request for status from an external system. If so, the delivery agent executes act 906. Otherwise, the delivery agent executes act 908.

In the act 906, the delivery agent retrieves the requested status information and transmits the requested status information to the external system. In some embodiments, the delivery agent retrieves the requested status information from the notification. In other embodiments, the delivery agent retrieves the requested status information from a market data store, such as the market data store 134 described above with reference to FIG. 1. In other embodiments, the delivery agent transmits the requested status information to the external system via the customer interface. The customer interface may facilitate this transfer using an HTTP API implemented by the client computer. After execution of the act 906, the process 900 ends.

In the act 908, the delivery agent determines whether the notification is a request for delivery of one or more transcription products. If so, the delivery agent executes act 910.

Otherwise, the delivery agent optionally records an indication that the notification was erroneous, and the process 900 ends.

In the act 910, the delivery agent determines the status of the transcription that is the basis for the requested transcription products. In some embodiments, the delivery agent determines the status of the transcription by parsing the notification. In other embodiments, the delivery agent determines the status of the transcription by querying the market data storage. The status of the transcription may indicate previous processing that the transcription has undergone (e.g., ASR processing, edited by a human editor, quality checked by a human editor, etc. . . . ). The status of the transcription may also indicate that particular portions have not undergone identified processing, while other portions have (e.g. a first portion has undergone ASR processing, a second portion has undergone human editing, and a third portion has undergone QA).

In the act 912, the delivery agent determines whether the status of the transcription meets combination criteria or quality threshold criteria included in the notification. If so, the delivery agent proceeds to act 914. Otherwise, the delivery agent proceeds to the act 906. The combination criteria in the notification may specify any combination of identified process completion criteria (e.g. criteria regarding processes that a transcription has undergone) and transcription segmentation criteria (e.g., criteria regarding whether the transcription covers an entire media file or only segments of the media file). For example, the combination criteria may specify that only full transcriptions that have completed QA are requested for delivery. Alternatively, the combination criteria may specify that any segment of a transcription that has completed ASR processing is requested for delivery. The combination criteria may also specify that segments of a transcription that have completed editing are requested for delivery if other segments of the transcription have completed QA. Embodiments are not limited to any particular combination criteria or set of combination criteria and any combination of identified process criteria and transcription segmentation criteria is intended to be within the scope of this disclosure.

In some embodiments, the quality threshold criteria in the notification may specify quality threshold criteria for each distinct element of combination criteria. In these embodiments, within the act 912, the delivery agent computes a value of a quality metric that indicates the confidence level or estimated accuracy of the transcription or segments of the transcription that meet the combination criteria corresponding to the quality threshold criteria. Where the value of the quality metric is in a predefined relationship (e.g., greater than or equal to) to the quality threshold value, the delivery agent deems the quality threshold criteria as being met and will not proceed to the act 906 unless the combination criteria described above is not met.

In the act 914, the delivery agent generates transcription products specified in the notification from the transcription information. In act 916, the delivery agent transmits the transcription products to a delivery point specified in the notification, and the process 900 ends.

Processes 400 through 900 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a transcription system configured according to the examples and embodiments disclosed herein.

The embodiments described herein progressively deliver transcription products of increasing quality in an iterative manner. In a simple example, the embodiments disclosed herein provide a first transcription generated from conventional ASR processing (usually within one hour of receipt of a media file), a second transcription generated from human editing (which represents a near-final version in which most errors are corrected and remaining problem areas, e.g. difficult words, are flagged), and a third transcription generated from human QA (nearly perfect quality). Any of these transcriptions (and products derived from them) may be selectively delivered only where the transcription meets quality threshold criteria. Additionally, subsets of each transcription may be selectively tested and delivered according to customer specifications.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for delivering one or more transcription products, the system comprising:
   a memory;
   at least one processor coupled to the memory;
   a customer interface component executable by the at least one processor and configured to receive transcription request information identifying at least one media file, the at least one media file including content;
   an automatic speech recognition component executable by the at least one processor and configured to generate draft transcription information that represents a draft transcription of the content;
   an editor interface component executable by the at least one processor and configured to generate edited transcription information that represents an edited transcription of the content; and
   a delivery agent component executable by the at least one processor and configured to:
      evaluate first delivery criteria to determine whether to deliver a first transcription product of the one or more transcription products;
      transmit the first transcription product in response to determining that the first delivery criteria is satisfied;
      evaluate second delivery criteria at least in part by:
         calculating a value of a quality metric using the edited transcription information; and
         determining that the value is less than a quality threshold value; and
      not transmit a second transcription product of the one or more transcription products in response to determining that the value is less than the quality threshold value.

2. The system according to claim 1, wherein the delivery agent component is configured to transmit the first transcription product at least in part by modifying a web page to embed the first transcription product within the web page as Hypertext Markup Language (HTML).

3. The system according to claim 1, wherein the delivery agent component is configured to evaluate the first delivery criteria at least in part by evaluating a schedule.

4. The system according to claim 1, wherein the delivery agent component is further configured to transmit at least one of the value of the quality metric and status information.

5. The system according to claim 1, wherein the delivery agent component is further configured to derive the first transcription product from the draft transcription information.

6. The system according to claim 5, wherein the first transcription product includes at least one of a transcription, metadata descriptive of the transcription, captions, captions encoded in a media file, a summarization, and a keyword.

7. The system according to claim 1, wherein the delivery agent component is further configured to:
evaluate third delivery criteria to determine whether to deliver a third transcription product of the one or more transcription products;
evaluate fourth delivery criteria to determine whether to deliver a fourth transcription product of the one or more transcription products; and
transmit at least one of the third transcription product and the fourth transcription product in response to determining that at least one of the third delivery criteria and the fourth delivery criteria is satisfied.

8. The system according to claim 7, wherein the editor interface component is further configured to generate QA transcription information that represents a QA transcription of the content and the delivery agent component is further configured to:
derive the third transcription product from the edited transcription information; and
derive the fourth transcription product from the QA transcription information.

9. The system according to claim 8, wherein the delivery agent component is further configured to:
receive a request for status information; and
respond to the request for the status information by transmitting status information descriptive of the QA transcription information.

10. The system according to claim 9, wherein the delivery agent component is further configured to:
receive a request for a latest transcription product;
evaluate the first delivery criteria at least in part by identifying the request for the latest transcription product;
evaluate the third delivery criteria at least in part by identifying the request for the latest transcription product;
evaluate the fourth delivery criteria at least in part by identifying the request for the latest transcription product; and
respond to the request for the latest transcription product by transmitting the fourth transcription product.

11. The system according to claim 1, wherein the delivery agent component is further configured to:
receive a request for a latest transcription product;
evaluate third delivery criteria at least in part by identifying the request for the latest transcription product;
evaluate fourth delivery criteria at least in part by identifying the request for the latest transcription product; and
respond to the request for the latest transcription product by transmitting a first portion of the first transcription product and a second portion of the second transcription product.

12. The system according to claim 11, wherein the delivery agent component is configured to:
evaluate the third delivery criteria at least in part by calculating a first value of the quality metric using the draft transcription information and determining that the first value is less than a first quality threshold value; and
evaluate the fourth delivery criteria at least in part by calculating a second value of the quality metric using at least a portion of the draft transcription information and at least a portion of the edited transcription information and determining that the second value is greater than a second quality threshold value.

13. The system according to claim 1, wherein the delivery agent component is further configured to:
receive a request for a latest transcription product;
evaluate third delivery criteria at least in part by identifying the request for the latest transcription product;
evaluate fourth delivery criteria at least in part by identifying the request for the latest transcription product; and
respond to the request for the latest transcription product by transmitting a portion of a second transcription product.

14. The system according to claim 13, wherein the delivery agent component is configured to:
evaluate the third delivery criteria at least in part by calculating a first value of the quality metric using the draft transcription information and determining that the first value is less than a first quality threshold value; and
evaluate the fourth delivery criteria at least in part by calculating a second value of the quality metric using at least a portion of the edited transcription information and determining that the second value is greater than a second quality threshold value.

15. A method for delivering a one or more transcription products, the method comprising:
receiving, by a customer interface component, transcription request information identifying at least one media file including content;
generating, by an automatic speech recognition component, draft transcription information that represents a draft transcription of the content;
generating, by an editor interface component, edited transcription information that represents an edited transcription of the content;
evaluating, by a delivery agent component, first delivery criteria to determine whether to deliver a first transcription product of the one or more transcription products;
transmitting, by the delivery agent component, the first transcription product in response to determining that the first delivery criteria is satisfied;
evaluating, by the delivery agent component, second delivery criteria at least in part by:
calculating a value of a quality metric using the edited transcription information; and
determining that the value is less than a quality threshold value; and
not transmitting a second transcription product of the one or more transcription products in response to determining that the value is less than the quality threshold value.

16. The method according to claim 15, further comprising:
evaluating, by the delivery agent component, third delivery criteria to determine whether to deliver a third transcription product of the one or more transcription products;

evaluating, by the delivery agent component, fourth delivery criteria to determine whether to deliver a fourth transcription product of the one or more transcription products; and transmitting, by the delivery agent component, at least one of the third transcription product and the fourth transcription product in response to determining that at least one of the second delivery criteria and the third delivery criteria is satisfied.

17. The method according to claim 16, further comprising:

generating, by the editor interface component, QA transcription information that represents a QA transcription of the content;

deriving, by the delivery agent component, the first transcription product from the draft transcription information;

deriving, by the delivery agent component, the third transcription product from the edited transcription information; and deriving, by the delivery agent component, the fourth transcription product from the QA transcription information.

18. A non-transitory computer readable medium storing sequences of computer executable instructions for delivering a one or more transcription products, the sequences of computer executable instructions including instructions that instruct at least one processor to:

receive, by a customer interface component, transcription request information identifying at least one media file including content;

generate, by an automatic speech recognition component, draft transcription information that represents a draft transcription of the content;

generate, by an editor interface component, edited transcription information that represents an edited transcription of the content;

evaluate, by a delivery agent component, first delivery criteria to determine whether to deliver a first transcription product of the one or more transcription products;

transmit, by the delivery agent component, the first transcription product in response to determining that the first delivery criteria is satisfied;

evaluate, by the delivery agent component, second delivery criteria at least in part by:

calculating a value of a quality metric using the edited transcription information; and determining that the value is less than a quality threshold value; and not transmit a second transcription product of the one or more transcription products in response to determining that the value is less than the quality threshold value.

19. The computer readable medium according to claim 18, wherein the instructions further instruct the at least one processor to:

evaluate third delivery criteria to determine whether to deliver a third transcription product of the one or more transcription products;

evaluate fourth delivery criteria to determine whether to deliver a fourth transcription product of the one or more transcription products; and transmit at least one of the third transcription product and the fourth transcription product in response to determining that at least one of the second delivery criteria and the third delivery criteria is satisfied.

20. The computer readable medium according to claim 19, wherein the instructions further instruct the at least one processor to:

generate, by the editor interface component, QA transcription information that represents a QA transcription of the content;

derive, by the delivery agent component, the first transcription product from the draft transcription information;

derive, by the delivery agent component, the third transcription product from the edited transcription information; and derive, by the delivery agent component, the fourth transcription product from the QA transcription information.

* * * * *